US010032324B2

(12) United States Patent
Akanuma et al.

(10) Patent No.: US 10,032,324 B2
(45) Date of Patent: Jul. 24, 2018

(54) CONTROL APPARATUS AND CONTROL SYSTEM CONTROLLING PROTECTIVE APPARATUS FOR PROTECTING PASSENGER OF VEHICLE OR PEDESTRIAN

(71) Applicant: Bosch Corporation, Tokyo (JP)

(72) Inventors: Ryojiro Akanuma, Kanagawa (JP); Kenji Arai, Kanagawa (JP); Keisuke Matsuura, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/897,341

(22) PCT Filed: May 19, 2014

(86) PCT No.: PCT/JP2014/063202
§ 371 (c)(1),
(2) Date: Dec. 10, 2015

(87) PCT Pub. No.: WO2014/199779
PCT Pub. Date: Dec. 18, 2014

(65) Prior Publication Data
US 2016/0140784 A1 May 19, 2016

(30) Foreign Application Priority Data
Jun. 12, 2013 (JP) .................. 2013-124037

(51) Int. Cl.
*G07C 5/08* (2006.01)
*B60R 21/01* (2006.01)
*G07C 5/00* (2006.01)

(52) U.S. Cl.
CPC ............ *G07C 5/0841* (2013.01); *B60R 21/01* (2013.01); *G07C 5/008* (2013.01); *G07C 5/0808* (2013.01);
(Continued)

(58) Field of Classification Search
CPC .... G07C 5/008; G07C 5/0808; G07C 5/0841; B60R 21/01; B60R 2021/01184; B60R 2021/01068
See application file for complete search history.

(56) References Cited

U.S. PATENT DOCUMENTS 6,683,534 B2   1/2004   Patterson et al.
8,044,782 B2 * 10/2011   Saban ............... B60N 2/002
                                                340/438
(Continued)

FOREIGN PATENT DOCUMENTS

CN   1362615   8/2002
CN   1363790   8/2002
(Continued)

OTHER PUBLICATIONS

International Search Report for Application No. PCT/JP2014/063202 dated Aug. 5, 2014 (English Translation, 1 pages).

*Primary Examiner* — Yuen H Wong
(74) *Attorney, Agent, or Firm* — Michael Best & Friedrich LLP

(57) ABSTRACT

An air bag ECU includes an ECU communication unit communicating with an external sensor (for example, a front right acceleration sensor) and a faulty sensor mount determination unit determining whether a faulty sensor having been diagnosed as being faulty before is connected to the air bag ECU based on failure history data indicating whether the external sensor has been diagnosed as being faulty before. The faulty sensor mount determination unit compares identification data recorded in, for example, a faulty sensor ID recording unit, for individually identifying an external sensor having been diagnosed as being faulty before with the identification data of the external sensor connected
(Continued)

to the air bag ECU and determines whether a faulty sensor is connected to the air bag ECU.

15 Claims, 15 Drawing Sheets

(52) U.S. Cl.
CPC .............. *B60R 2021/01068* (2013.01); *B60R 2021/01184* (2013.01)

(56) References Cited

U.S. PATENT DOCUMENTS

| | | | |
|---|---|---|---|
| 2003/0222767 | A1 | 12/2003 | Patterson et al. |
| 2007/0043507 | A1 | 2/2007 | Tobaru |
| 2012/0136541 | A1* | 5/2012 | Inamoto ............. B60R 21/0132 701/45 |

FOREIGN PATENT DOCUMENTS

| | | |
|---|---|---|
| CN | 1648809 | 8/2005 |
| CN | 102485544 | 6/2012 |
| DE | 10005445 | 8/2000 |
| JP | H05322921 | 12/1993 |
| JP | 815300 | 1/1996 |
| JP | H0815300 | 1/1996 |
| JP | 2001199260 | 7/2001 |
| JP | 2001206190 | 7/2001 |
| JP | 2003109177 | 4/2003 |
| JP | 2004125594 | 4/2004 |
| JP | 2005212617 | 8/2005 |
| JP | 2006304069 | 11/2006 |
| JP | 2007050832 | 3/2007 |
| JP | 2008519971 | 6/2008 |
| JP | 2012126383 | 7/2012 |

\* cited by examiner

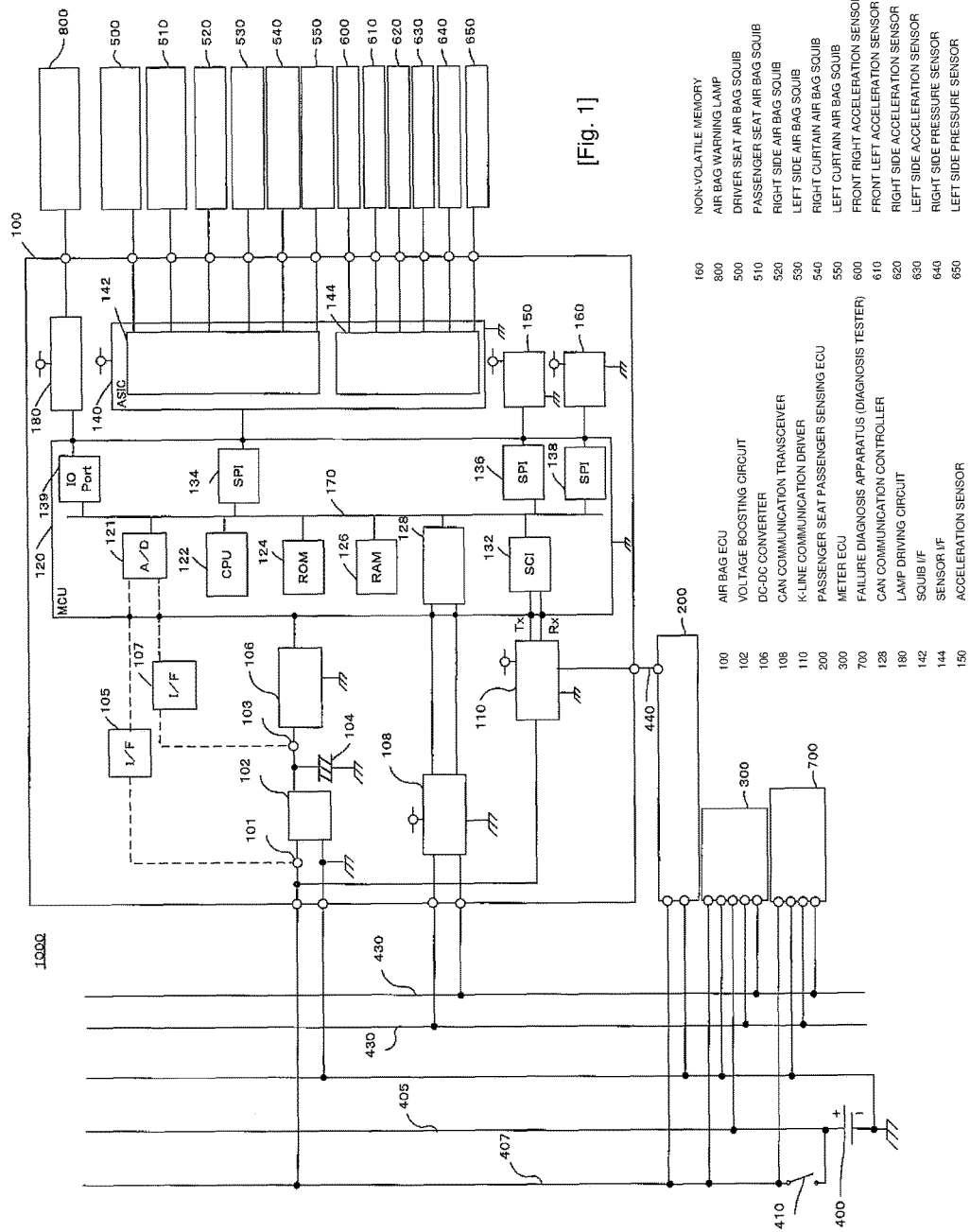

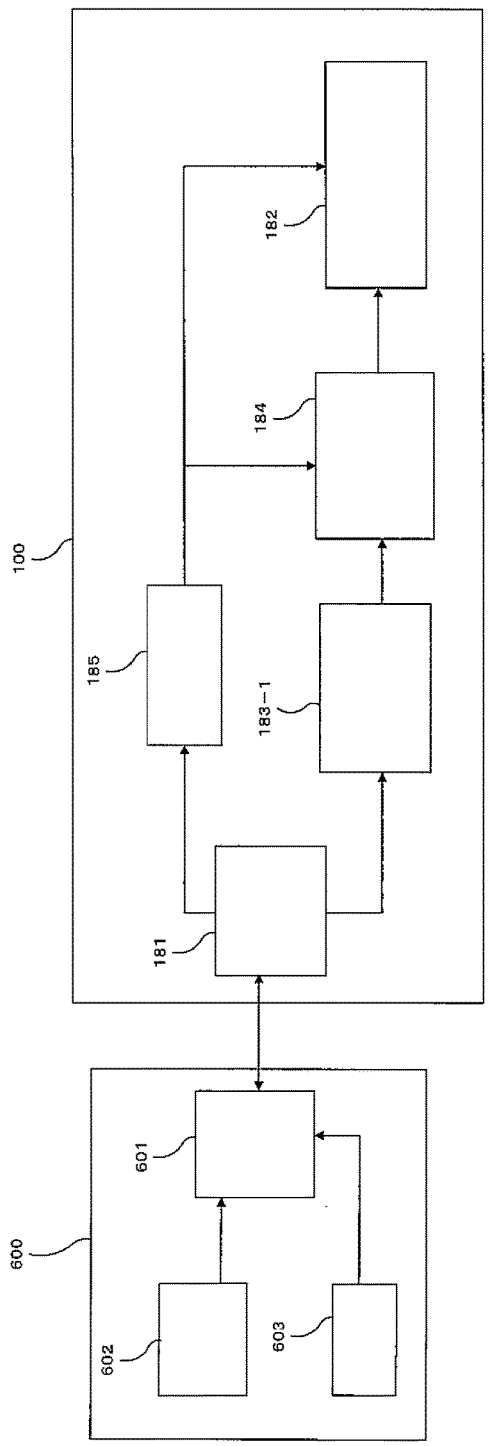
[Fig. 2]
| | |
|---|---|
| 602 | SENSOR ID RECORDING UNIT |
| 603 | IMPACT DETECTION UNIT |
| 601 | SENSOR COMMUNICATION UNIT |
| 181 | ECU COMMUNICATION UNIT |
| 185 | INSTALLED SENSOR ID RECORDING UNIT |
| 183-1 | FIRST SENSOR FAILURE DIAGNOSIS UNIT |
| 184 | FAULTY SENSOR ID RECORDING UNIT |
| 182 | FAULTY SENSOR MOUNT DETERMINATION UNIT |

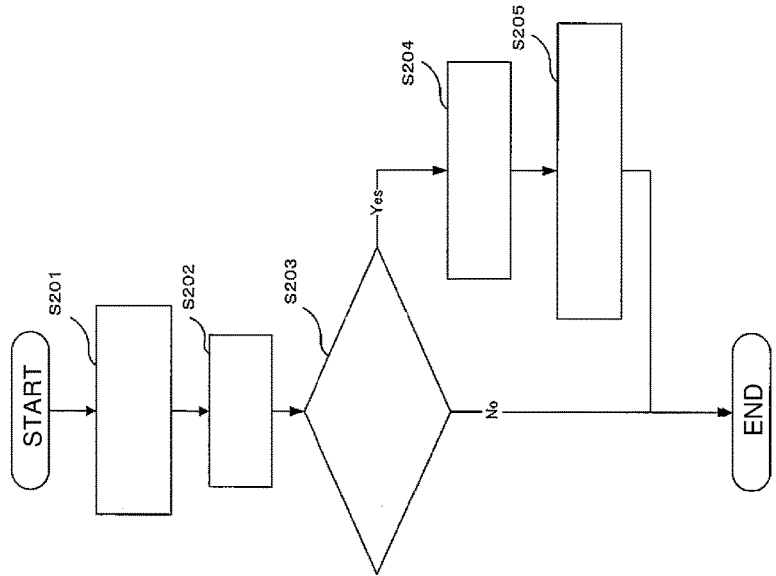
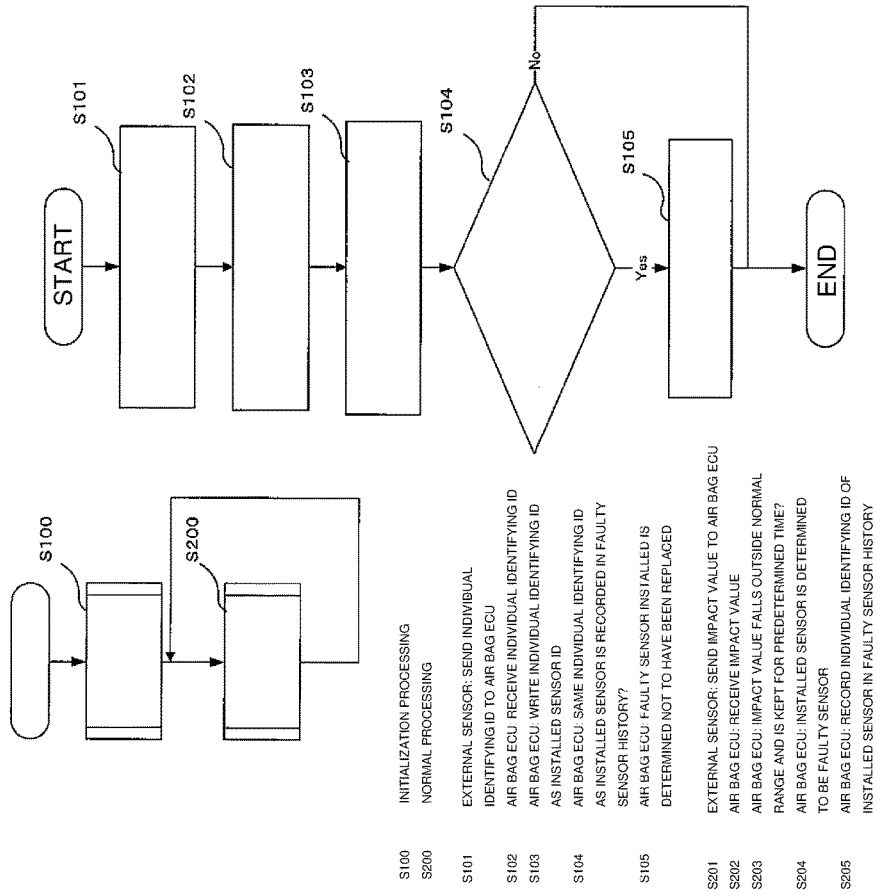

S100  INITIALIZATION PROCESSING
S200  NORMAL PROCESSING
S101  EXTERNAL SENSOR: SEND INDIVIDUAL IDENTIFYING ID TO AIR BAG ECU
S102  AIR BAG ECU: RECEIVE INDIVIDUAL IDENTIFYING ID
S103  AIR BAG ECU: WRITE INDIVIDUAL IDENTIFYING ID AS INSTALLED SENSOR ID
S104  AIR BAG ECU: SAME INDIVIDUAL IDENTIFYING ID AS INSTALLED SENSOR IS RECORDED IN FAULTY SENSOR HISTORY?
S105  AIR BAG ECU: FAULTY SENSOR INSTALLED IS DETERMINED NOT TO HAVE BEEN REPLACED
S201  EXTERNAL SENSOR: SEND IMPACT VALUE TO AIR BAG ECU
S202  AIR BAG ECU: RECEIVE IMPACT VALUE
S203  AIR BAG ECU: IMPACT VALUE FALLS OUTSIDE NORMAL RANGE AND IS KEPT FOR PREDETERMINED TIME?
S204  AIR BAG ECU: INSTALLED SENSOR IS DETERMINED TO BE FAULTY SENSOR
S205  AIR BAG ECU: RECORD INDIVIDUAL IDENTIFYING ID OF INSTALLED SENSOR IN FAULTY SENSOR HISTORY

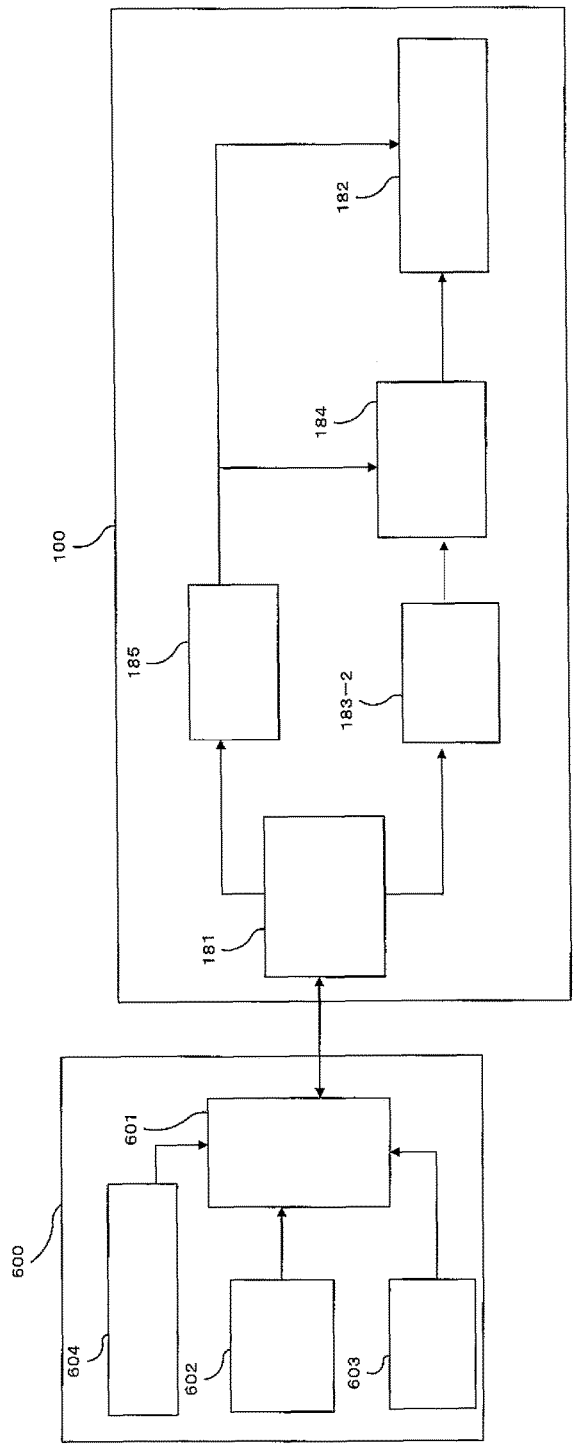
[Fig. 4]
| 604 | IN-SENSOR FAILURE DIAGNOSIS UNIT |
| 602 | SENSOR ID RECORDING UNIT |
| 601 | SENSOR COMMUNICATION UNIT |
| 603 | IMPACT DETECTION UNIT |
| 181 | ECU COMMUNICATION UNIT |
| 185 | INSTALLED SENSOR ID RECORDING UNIT |
| 183-2 | SECOND SENSOR FAILURE DIAGNOSIS UNIT |
| 184 | FAULTY SENSOR ID RECORDING UNIT |
| 182 | FAULTY SENSOR MOUNT DETERMINATION UNIT |

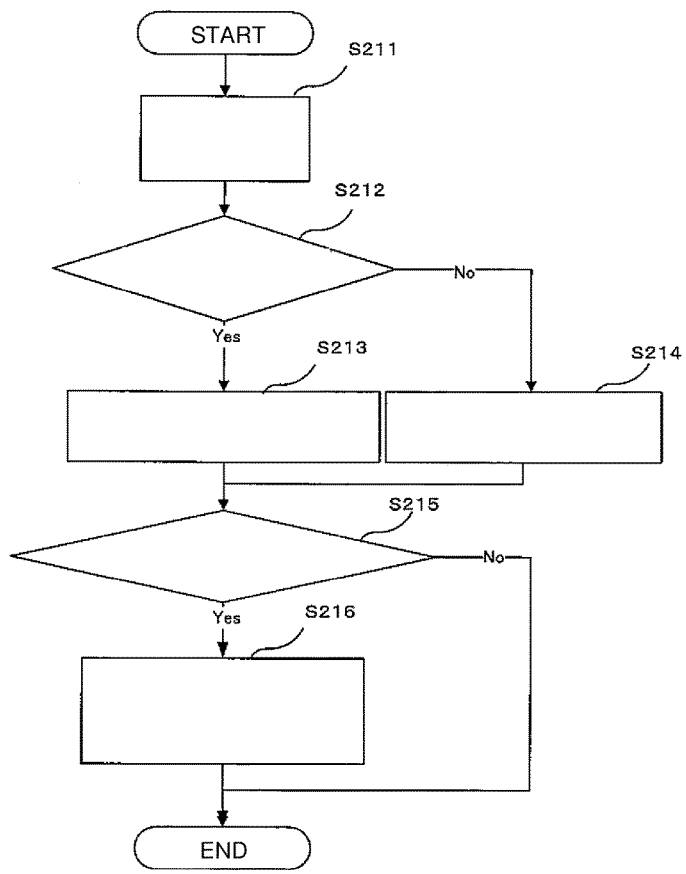

[Fig. 5]

S211 EXTERNAL SENSOR: PERFORM INTERNAL FAILURE DIAGNOSIS
S212 EXTERNAL SENSOR: DIAGNOSIS RESULT OF SENSOR INDICATES FAILURE?
S213 EXTERNAL SENSOR: SEND FAILURE INFORMATION TO ECU
S214 EXTERNAL SENSOR: SEND IMPACT VALUE TO ECU
S215 AIR BAG ECU: RECEIVED DATA FROM SENSOR IS FAILURE INFORMATION?
S216 AIR BAG ECU: RECORD INDIVIDUAL IDENTIFYING ID OF INSTALLED SENSOR IN FAULTY SENSOR HISTORY

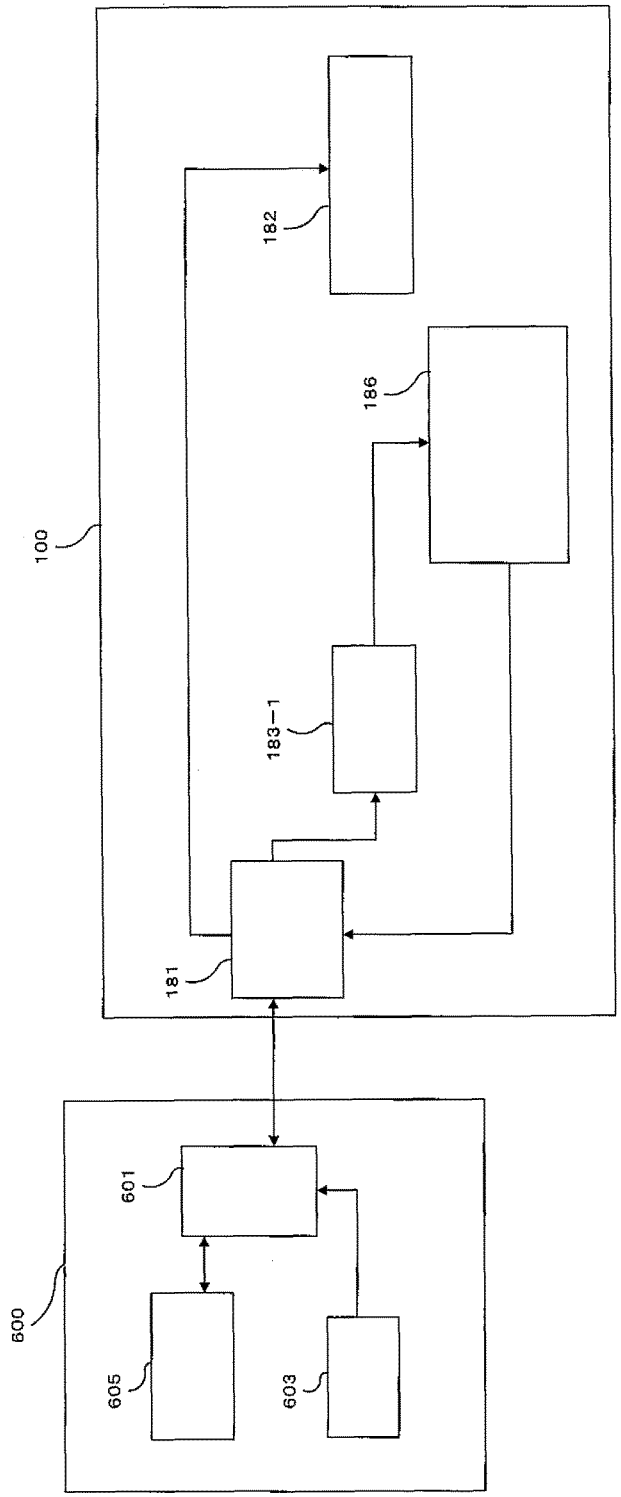
[Fig. 6]
| | |
|---|---|
| 605 | FAILURE HISTORY RECORDING UNIT |
| 601 | SENSOR COMMUNICATION UNIT |
| 603 | IMPACT DETECTION UNIT |
| 181 | ECU COMMUNICATION UNIT |
| 183-1 | FIRST SENSOR FAILURE DIAGNOSIS UNIT |
| 186 | WRITING REQUESTING UNIT |
| 182 | FAULTY SENSOR MOUNT DETERMINATION UNIT |

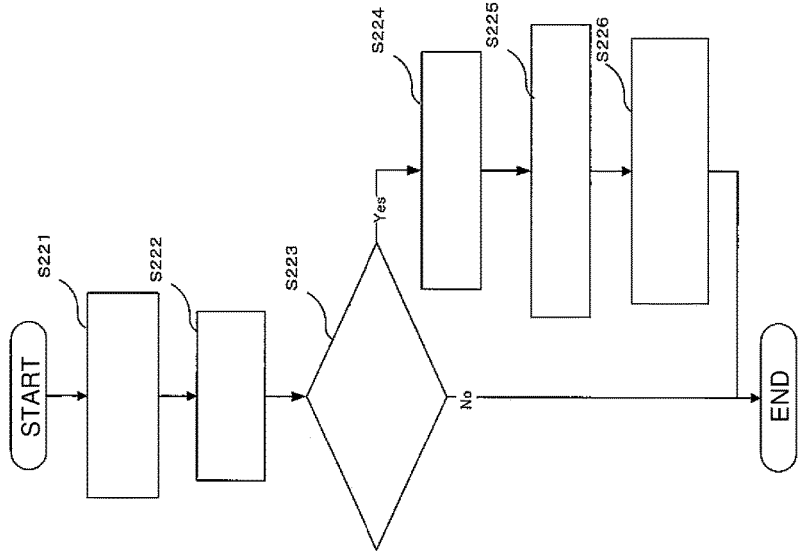

[Fig. 7a]

| S121 | EXTERNAL SENSOR: RECORD IS PRESENT IN INTERNAL FAILURE HISTORY OF SENSOR? |
| S122 | EXTERNAL SENSOR: SEND PRESENCE OF INTERNAL FAILURE TO AIR BAG ECU |
| S123 | EXTERNAL SENSOR: SEND ABSENCE OF INTERNAL FAILURE TO AIR BAG ECU |
| S124 | AIR BAG ECU: RECEIVED DATA FROM SENSOR INDICATES PRESENCE OF INTERNAL FAILURE? |
| S125 | AIR BAG ECU: FAULTY SENSOR INSTALLED IS DETERMINED NOT TO HAVE BEEN REPLACED |

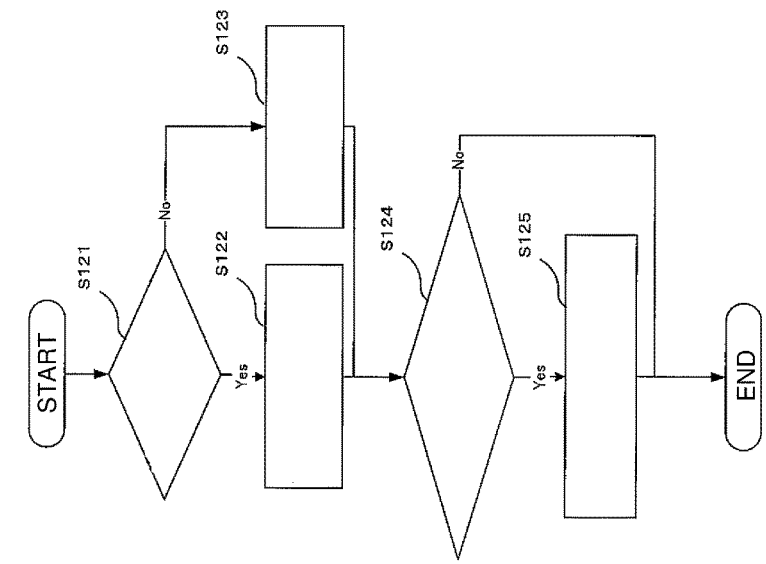

[Fig. 7b]

| S221 | EXTERNAL SENSOR: SEND IMPACT VALUE TO AIR BAG ECU |
| S222 | AIR BAG ECU: RECEIVE IMPACT VALUE |
| S223 | AIR BAG ECU: IMPACT VALUE FALLS OUTSIDE NORMAL RANGE AND IS KEPT FOR PREDETERMINED TIME? |
| S224 | AIR BAG ECU: INSTALLED SENSOR IS DETERMINED TO BE FAULTY SENSOR |
| S225 | AIR BAG ECU: SEND FAILURE INFORMATION TO EXTERNAL SENSOR |
| S226 | AIR BAG ECU: RECORD RECEIVED FAILURE INFORMATION IN INTERNAL FAILURE HISTORY |

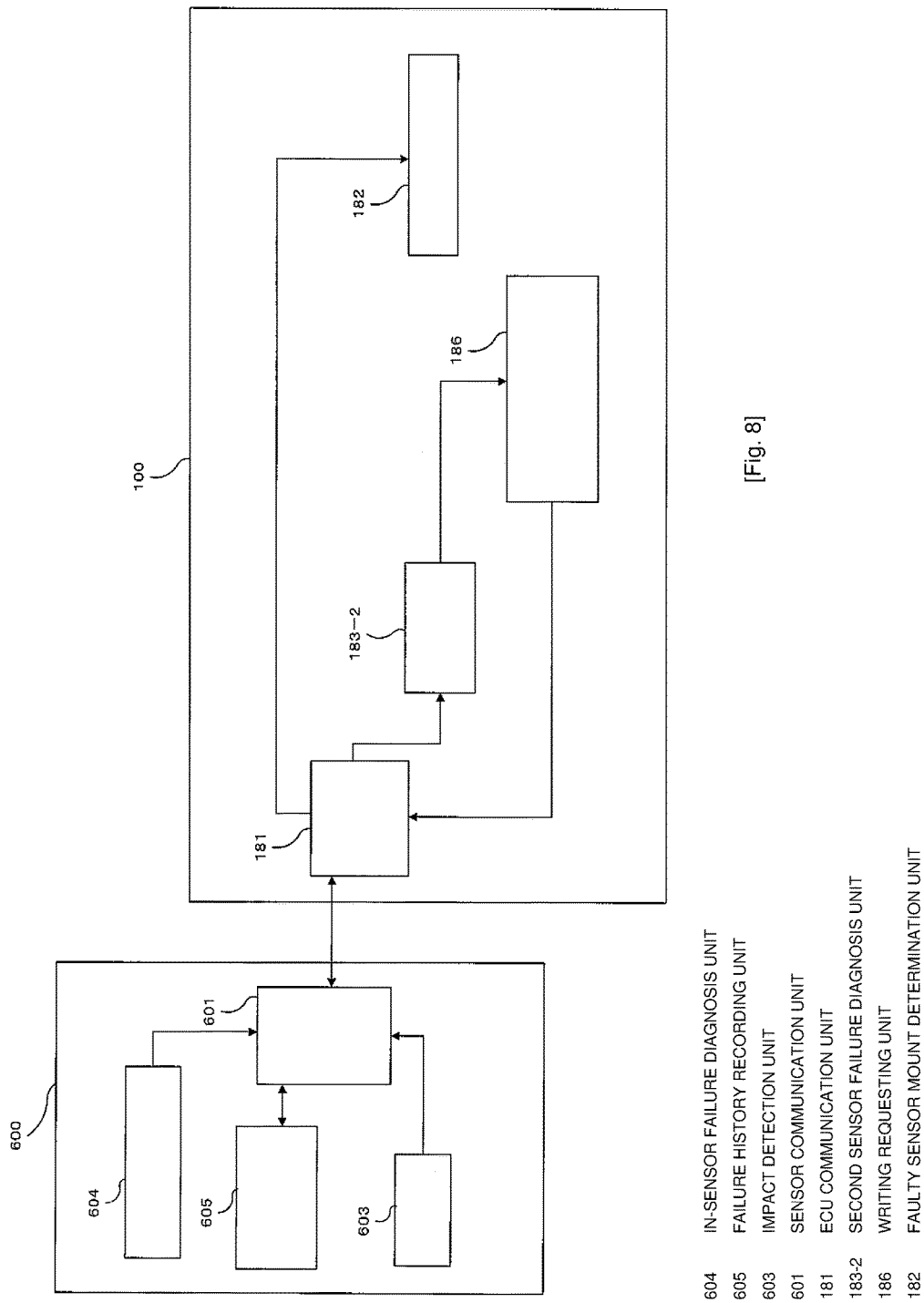

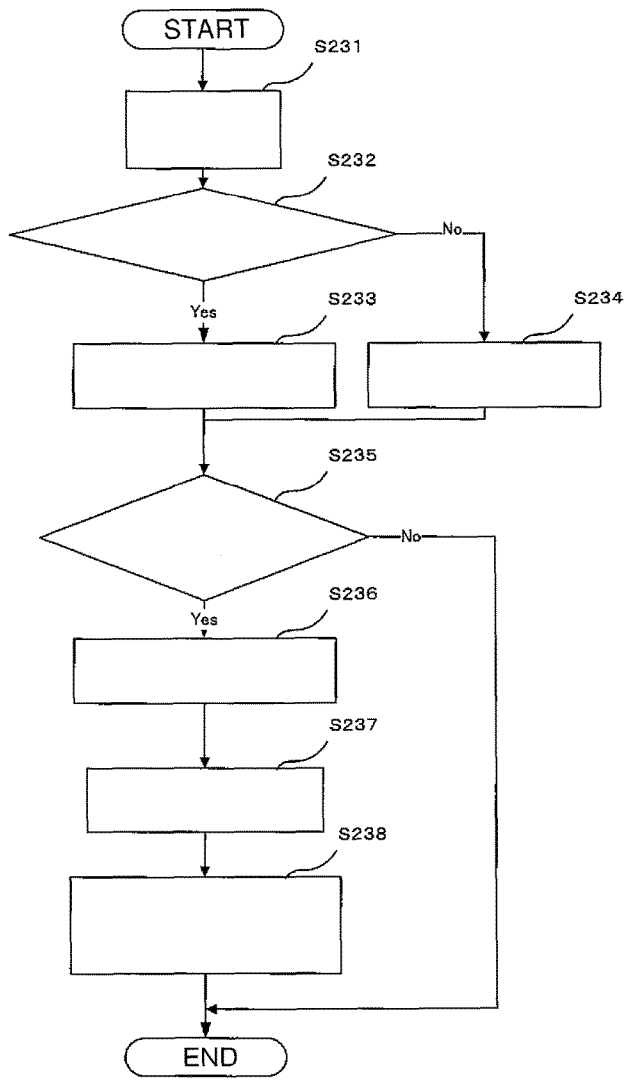

[Fig. 9]

S231  EXTERNAL SENSOR: PERFORM INTERNAL FAILURE DIAGNOSIS
S232  EXTERNAL SENSOR: DIAGNOSIS RESULT INDICATES FAILURE?
S233  EXTERNAL SENSOR: SEND FAILURE INFORMATION TO AIR BAG ECU
S234  EXTERNAL SENSOR: SEND IMPACT VALUE TO AIR BAG ECU
S235  AIR BAG ECU: RECEIVED DATA FROM SENSOR IS FAILURE STATE?
S236  AIR BAG ECU: INSTALLED SENSOR IS DETERMINED TO BE FAULTY SENSOR
S237  AIR BAG ECU: SEND FAILURE INFORMATION TO SENSOR
S238  AIR BAG ECU: RECORD RECEIVED FAILURE INFORMATION IN INTERNAL FAILURE HISTORY

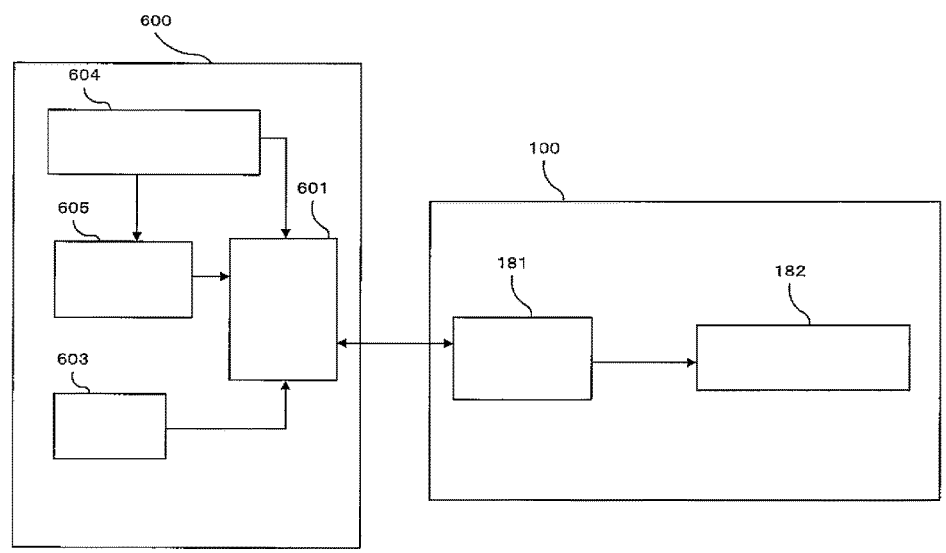
[Fig. 10]
| | |
|---|---|
| 604 | IN-SENSOR FAILURE DIAGNOSIS UNIT |
| 605 | FAILURE HISTORY RECORDING UNIT |
| 603 | IMPACT DETECTION UNIT |
| 601 | SENSOR COMMUNICATION UNIT |
| 181 | ECU COMMUNICATION UNIT |
| 182 | FAULTY SENSOR MOUNT DETERMINATION UNIT |

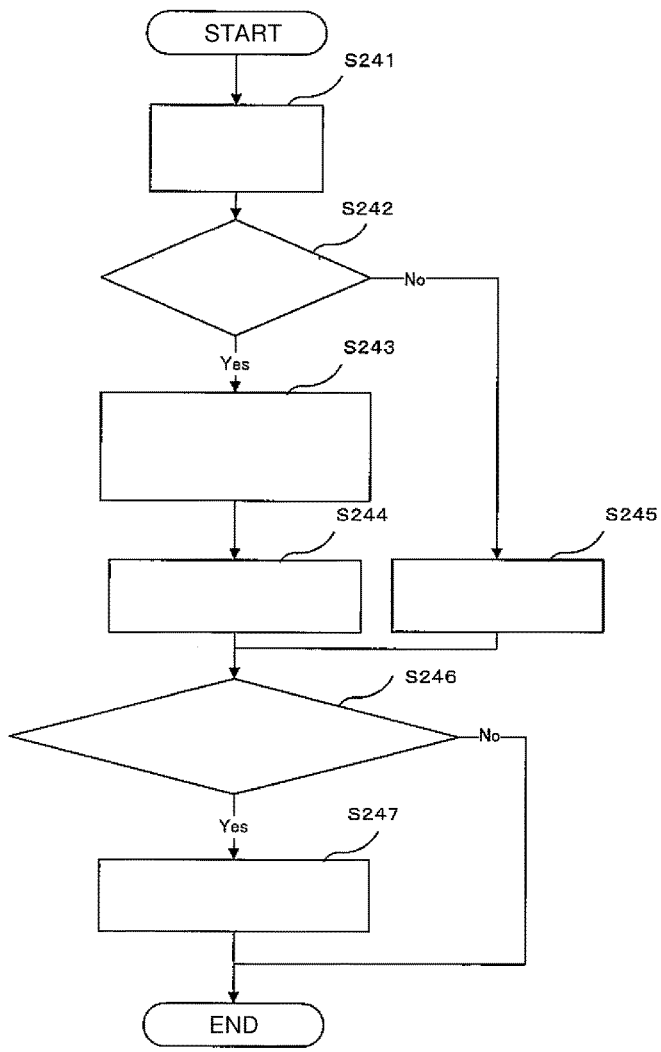

[Fig. 11]

| S241 | EXTERNAL SENSOR: PERFORM INTERNAL FAILURE DIAGNOSIS |
| S242 | EXTERNAL SENSOR: DIAGNOSIS RESULT INDICATES FAILURE? |
| S243 | EXTERNAL SENSOR: STORE FAILURE INFORMATION IN FAILURE HISTORY RECORDING UNIT OF SENSOR |
| S244 | EXTERNAL SENSOR: SEND FAILURE INFORMATION TO ECU |
| S245 | EXTERNAL SENSOR: SEND IMPACT VALUE TO ECU |
| S246 | AIR BAG ECU: RECEIVED DATA FROM EXTERNAL SENSOR IS FAILURE STATE? |
| S247 | AIR BAG ECU: INSTALLED SENSOR IS DETERMINED TO BE FAULTY SENSOR |

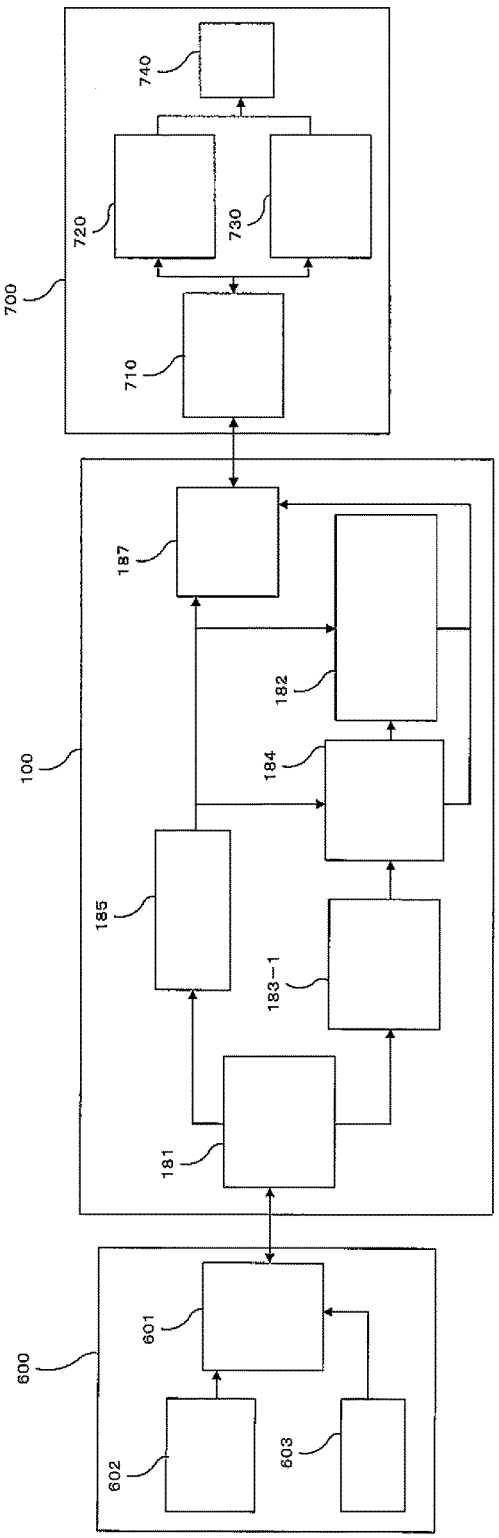

[Fig. 12]

| | |
|---|---|
| 602 | SENSOR ID RECORDING UNIT |
| 603 | IMPACT DETECTION UNIT |
| 601 | SENSOR COMMUNICATION UNIT |
| 181 | ECU COMMUNICATION UNIT |
| 185 | INSTALLED SENSOR ID RECORDING UNIT |
| 183-1 | FIRST SENSOR FAILURE DIAGNOSIS UNIT |
| 184 | FAULTY SENSOR ID RECORDING UNIT |
| 182 | FAULTY SENSOR MOUNT DETERMINATION UNIT |
| 187 | ECU SECOND COMMUNICATION UNIT |
| 710 | FAILURE DIAGNOSIS APPARATUS COMMUNICATION UNIT |
| 720 | INSTALLED SENSOR ID READING UNIT |
| 730 | FAULTY SENSOR ID READING UNIT |
| 740 | DISPLAY UNIT |

[Fig. 13b]

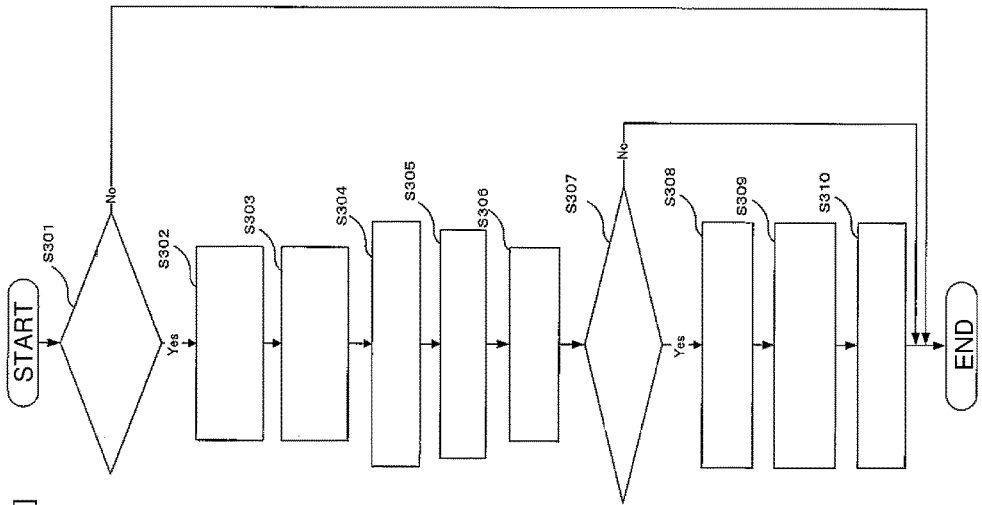

[Fig. 13a]

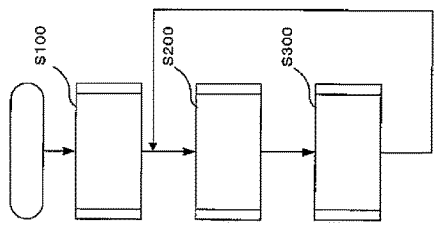

S100 INITIALIZATION PROCESSING
S200 NORMAL PROCESSING
S300 FAILURE DIAGNOSIS APPARATUS COMMUNICATION PROCESSING
S301 AIR BAG ECU: FAILURE DIAGNOSIS APPARATUS IS CONNECTED?
S302 FAILURE DIAGNOSIS APPARATUS: REQUEST AIR BAG ECU TO INDICATE INDIVIDUAL IDENTIFYING ID OF SENSOR CURRENTLY CONNECTED
S303 AIR BAG ECU: SEND INDIVIDUAL IDENTIFYING ID OF SENSOR CURRENTLY CONNECTED TO FAILURE DIAGNOSIS APPARATUS
S304 FAILURE DIAGNOSIS APPARATUS: DISPLAY INDIVIDUAL IDENTIFYING ID OF SENSOR CURRENTLY CONNECTED
S305 FAILURE DIAGNOSIS APPARATUS: REQUEST AIR BAG ECU TO INDICATE WHETHER FAULTY SENSOR IS CONNECTED
S306 AIR BAG ECU: SEND TO FAILURE DIAGNOSIS APPARATUS WHETHER FAULTY SENSOR IS CONNECTED
S307 FAILURE DIAGNOSIS APPARATUS: FAULTY SENSOR IS CONNECTED?
S308 FAILURE DIAGNOSIS APPARATUS: REQUEST AIR BAG ECU TO INDICATE INDIVIDUAL IDENTIFYING ID OF FAULTY SENSOR
S309 AIR BAG ECU: SEND INDIVIDUAL IDENTIFYING ID OF FAULTY SENSOR TO FAILURE DIAGNOSIS APPARATUS
S310 FAILURE DIAGNOSIS APPARATUS: DISPLAY INDIVIDUAL IDENTIFYING ID OF FAULTY SENSOR

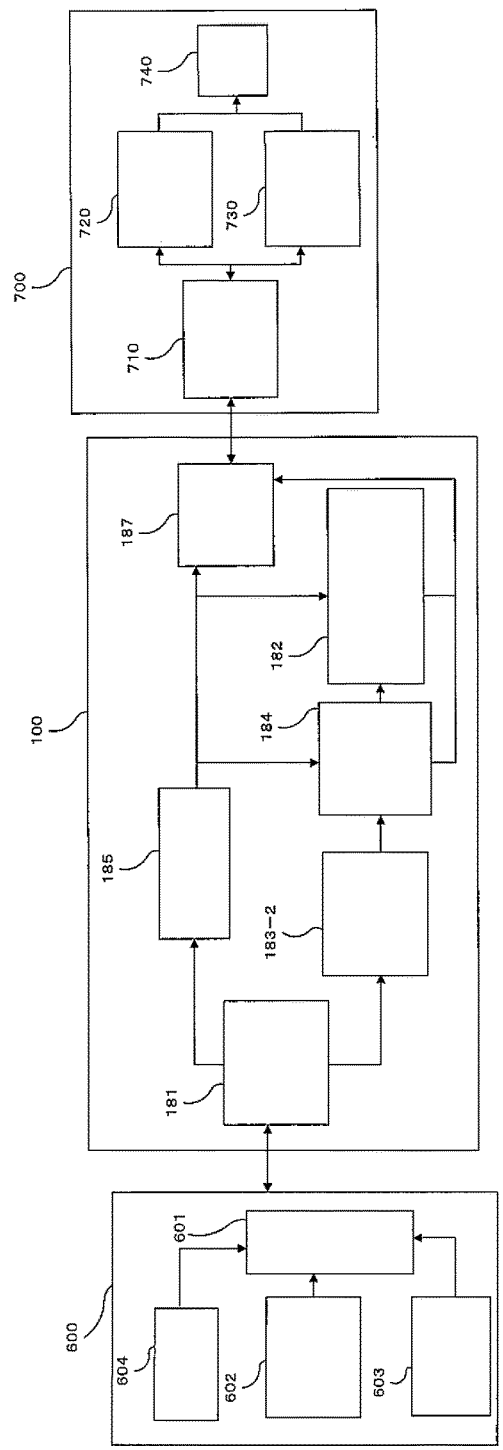

[Fig. 14]

| | |
|---|---|
| 604 | IN-SENSOR FAILURE DIAGNOSIS UNIT |
| 602 | SENSOR ID RECORDING UNIT |
| 603 | IMPACT DETECTION UNIT |
| 601 | SENSOR COMMUNICATION UNIT |
| 181 | ECU COMMUNICATION UNIT |
| 185 | INSTALLED SENSOR ID RECORDING UNIT |
| 183-2 | SECOND SENSOR FAILURE DIAGNOSIS UNIT |
| 184 | FAULTY SENSOR ID RECORDING UNIT |
| 182 | FAULTY SENSOR MOUNT DETERMINATION UNIT |
| 187 | ECU SECOND COMMUNICATION UNIT |
| 710 | FAILURE DIAGNOSIS APPARATUS COMMUNICATION UNIT |
| 720 | INSTALLED SENSOR ID READING UNIT 100 |
| 730 | INSTALLED SENSOR ID READING UNIT |
| 740 | DISPLAY UNIT |

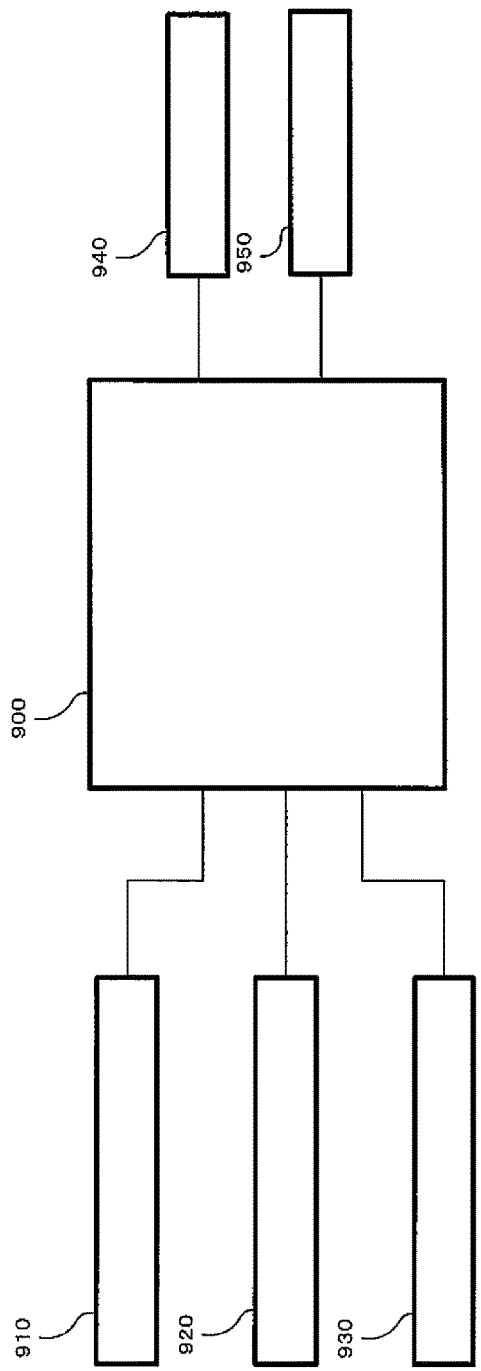

CONTROL APPARATUS AND CONTROL SYSTEM CONTROLLING PROTECTIVE APPARATUS FOR PROTECTING PASSENGER OF VEHICLE OR PEDESTRIAN

BACKGROUND OF THE INVENTION

The present invention relates to a control apparatus and control system that controls a protective apparatus for protecting passengers in a vehicle or pedestrians.

Conventionally, a vehicle has been provided with a protective apparatus (such as, for example, an air bag) for protecting passengers in a vehicle or pedestrians and the activation of the protective apparatus is controlled by a control apparatus. An external sensor (such as, for example, an acceleration sensor for detecting an impact on the vehicle) for determining whether the protective apparatus is activated is connected to the control apparatus. When the external sensor detects an impact on the vehicle, the control apparatus dampers an impact on passengers in the vehicle by expanding the air bag or dampers an impact on pedestrians by lifting the hood of the vehicle.

Since the external sensor becomes faulty due to various causes, the prior art may perform failure diagnosis of the external sensor. For example, when the address set for the external sensor and the unique information of the external sensor are sent from the external sensor, the control apparatus associates these data items and stores them as corresponding information. Then, when unique information is sent from the external sensor, the control apparatus compares the sent unique information with the corresponding information and, if the part of the unique information does not match the corresponding information, diagnoses the external sensor having the part of the unique information as being faulty.

SUMMARY OF THE INVENTION

However, the prior art does not consider a determination as to whether a faulty sensor having been diagnosed as being faulty before is connected to the control apparatus.

That is, in the prior art, even when an external sensor is determined to be faulty once, after recovery from the failure, the external sensor may have been used to determine whether protective apparatus is activated even though the failure may occur again without being replaced. A failure that occurs again is, for example, a failure that occurs due to a short-circuit of the circuit on a board of the external sensor because a metal piece moves on the board due to vibration of the vehicle when, for example, a small conductive metal piece or the like is included during assembly process of the housing of the external sensor. Accordingly, an external sensor having been diagnosed as having its own failure can be replaced immediately with a good external sensor.

In addition, when a faulty external sensor having a failure difficult to reproduce is found in the assembly line for vehicles, if the faulty external sensor is erroneously assembled to a vehicle, the faulty external sensor cannot be detected until a failure occurs again.

In addition, in the assembly line for vehicles, to ensure the traceability (history) of a vehicle and an external sensor attached to the vehicle, a barcode label or two-dimensional barcode label on which information including the model and individual identifying ID of the external sensor is printed may be attached to the external sensor. That is, before an external sensor is assembled to a vehicle in the assembly line for vehicles, the traceability of external sensor to be attached to the vehicle is ensured using a computer system by reading the barcode of the external sensor with a barcode reader or the like. However, to increase the room space of a vehicle or for other reasons, the size reduction of an external sensor has been requested recently. Size reduction of an external sensor makes it difficult to obtain sufficient space to attach a barcode label to an external sensor. Since it is difficult for a person to visually identify an external sensor without a barcode label, the method for surely preventing faulty sensors from being put on the market has been requested.

On the other hand, methods for connecting sensors via a bus have been proposed (daisy chain connection and parallel connection). Since data from a plurality of external sensors connected via a single bus needs to be sent from the external sensors to an ECU at the same control cycle in either method, there is a restriction on the amount of data to be sent at a time. Since a vehicle may include two to eight external sensors, if a million vehicles having a protective apparatus are produced in a year, two to eight million external sensors are used. In this case, to individually identify external sensors, approximately at least three bytes are necessary even in the case of simple numeral data. In addition, if a measure such as addition of data for identifying different product models is taken, more than several bytes are necessary. If the communication speed is increased to send such a large amount of data at a time, disadvantage such as degradation in the EMC performance is caused.

Accordingly, an object of the invention in the present application is to determine whether a faulty sensor having been diagnosed as being faulty before is connected to the control apparatus.

According to an embodiment of the present invention, to address the above problem, there is provided a control apparatus controlling a protective apparatus for protecting a passenger of a vehicle or a pedestrian, characterized by including a communication unit communicating with an external sensor connected to the control apparatus and a determination unit determining whether a faulty sensor having been diagnosed as being faulty before is connected to the control apparatus, based on failure history data indicating whether the external sensor has been diagnosed as being faulty before.

In addition, the determination unit may compare identification data for individually identifying the external sensor connected to the control apparatus with identification data for individually identifying a faulty sensor having been diagnosed as being faulty before and determine whether the faulty sensor is connected to the control apparatus.

In addition, when the communication unit receives, from the external sensor, sensing data detected by the external sensor and the identification data for individually identifying the external sensor, the control apparatus may further include a sensor failure diagnosis unit diagnosing whether the external sensor is faulty based on the sensing data and a faulty sensor ID recording unit recording, as the failure history data, the identification data of the external sensor diagnosed as being faulty by the sensor failure diagnosis unit, and the determination unit may compare the identification data recorded in the faulty sensor ID recording unit with the identification data received by the communication unit and determine whether the faulty sensor is connected to the control apparatus.

In addition, when the communication unit receives, from the external sensor, a diagnosis result indicating whether the external sensor is faulty and the identification data for individually identifying the external sensor, the control apparatus may further include a sensor failure diagnosis unit diagnosing whether the external sensor is faulty based on the diagnosis result sent from the external sensor and a faulty sensor ID recording unit recording, as the failure history data, the identification data of the external sensor diagnosed as being faulty by the sensor failure diagnosis unit, and the determination unit may compare the identification data recorded in the faulty sensor ID recording unit with the identification data received by the communication unit and determine whether the faulty sensor is connected to the control apparatus.

In addition, the determination unit may determine whether the faulty sensor is connected to the control apparatus based on the failure history data recorded in a failure history recording unit provided in the external sensor.

In addition, when the communication unit receives, from the external sensor, sensing data detected by the external sensor, the control apparatus may further include a sensor failure diagnosis unit diagnosing whether the external sensor is faulty based on the sensing data and a writing requesting unit, when the external sensor is diagnosed as being faulty by the sensor failure diagnosis unit, outputting a request for recording, as the failure history data, failure information in a failure history recording unit provided in the external sensor diagnosed as being faulty, the communication unit may receive, from the external sensor, the failure information recorded in the failure history recording unit, and the determination unit may determine whether the faulty sensor is connected to the control apparatus based on the failure information received by the communication unit.

In addition, when the communication unit receives, from the external sensor, a diagnosis result indicating whether the external sensor is faulty, the control apparatus may further include a sensor failure diagnosis unit diagnosing whether the external sensor is faulty based on the diagnosis result sent from the external sensor and a writing requesting unit, when the external sensor is diagnosed as being faulty by the sensor failure diagnosis unit, outputting a request for recording, as the failure history data, failure information in a failure history recording unit provided in the external sensor diagnosed as being faulty, the communication unit may receive, from the external sensor, the failure information recorded in the failure history recording unit, and the determination unit may determine whether the faulty sensor is connected to the control apparatus based on the failure information received by the communication unit.

In addition, when the communication unit receives the failure history data from the external sensor, the determination unit may determine whether the faulty sensor is connected to the control apparatus based on the failure history data received by the communication unit.

According to an embodiment of the present invention, there is provided a control system including a control apparatus controlling a protective apparatus for protecting a passenger of a vehicle or a pedestrian and an external sensor connected to the control apparatus, in which the external sensor includes a sensor communication unit communicating with the control apparatus and the control apparatus includes an apparatus communication unit communicating with the external sensor and a determination unit determining whether a faulty sensor having been diagnosed as being faulty before is connected to the control apparatus, based on failure history data indicating whether the external sensor has been diagnosed as being faulty before.

In addition, the determination unit may compare identification data for individually identifying the external sensor connected to the control apparatus with identification data for individually identifying a faulty sensor having been diagnosed as being faulty before and determine whether the faulty sensor is connected to the control apparatus.

In addition, the external sensor may further include a sensor ID recording unit in which the identification data for individually identifying the external sensor is recorded and a detection unit detecting data used to determine whether the protective apparatus is activated, the apparatus communication unit may receive, from the sensor communication unit, sensing data detected by the detection unit and the identification data recorded in the sensor ID recording unit, the control apparatus may further include a sensor failure diagnosis unit diagnosing whether the external sensor is faulty based on the sensing data and a faulty sensor ID recording unit recording, as the failure history data, the identification data of the external sensor diagnosed as being faulty by the sensor failure diagnosis unit, and the determination unit may compare the identification data recorded in the faulty sensor ID recording unit with the identification data received by the apparatus communication unit and determine whether the faulty sensor is connected to the control apparatus.

In addition, the control apparatus may further include an installed sensor ID recording unit in which identification data for individually identifying the external sensor currently connected to the control apparatus is recorded and the control system may further include a failure diagnosis apparatus including an installed sensor ID reading unit reading the identification data recorded in the installed sensor ID recording unit, a faulty sensor ID reading unit reading the identification data recorded in the faulty sensor ID recording unit, and a display unit displaying the identification data read by the installed sensor ID reading unit and the identification data read by the faulty sensor ID reading unit.

In addition, the external sensor may further include a sensor ID recording unit in which the identification data for individually identifying the external sensor is recorded and an in-sensor failure diagnosis unit diagnosing whether the external sensor is faulty, the apparatus communication unit may receive, from the sensor communication unit, a diagnosis result by the in-sensor failure diagnosis unit and the identification data recorded in the sensor ID recording unit, the control apparatus may further include a sensor failure diagnosis unit diagnosing whether the external sensor is faulty based on the diagnosis result sent from the external sensor and a faulty sensor ID recording unit recording, as the failure history data, the identification data of the external sensor diagnosed as being faulty by the sensor failure diagnosis unit, and the determination unit may compare the identification data recorded in the faulty sensor ID recording unit with the identification data received by the apparatus communication unit and determine whether the faulty sensor is connected to the control apparatus.

In addition, the control apparatus may further include an installed sensor ID recording unit in which identification data for individually identifying the external sensor currently connected to the control apparatus and the control system may further include a failure diagnosis apparatus including an installed sensor ID reading unit reading the identification data recorded in the installed sensor ID recording unit, a faulty sensor ID reading unit reading the identification data recorded in the faulty sensor ID recording unit, and a display unit displaying the identification data read by the installed sensor ID reading unit and the identification data read by the faulty sensor ID reading unit.

In addition, the determination unit may determine whether the faulty sensor is connected to the control apparatus based on failure history data recorded in a failure history recording unit provided in the external sensor.

In addition, the external sensor may further include a detection unit detecting data used to determine whether the protective apparatus is activated and a failure history recording unit recording the failure history data, the apparatus communication unit may receive, from the sensor communication unit, sensing data detected by the detection unit, the control apparatus may further include a sensor failure diagnosis unit diagnosing whether the external sensor is faulty based on the sensing data and a writing requesting unit, when the external sensor is diagnosed as being faulty by the sensor failure diagnosis unit, outputting a request for recording, as the failure history data, failure information in the failure history recording unit provided in the external sensor diagnosed as being faulty, the apparatus communication unit may receive, from the sensor communication unit, the failure information recorded in the failure history recording unit, and the determination unit may determine whether the faulty sensor is connected to the control apparatus based on the failure information received by the apparatus communication unit.

In addition, the external sensor may further include an in-sensor failure diagnosis unit diagnosing whether the external sensor is faulty and the failure history recording unit in which the failure history data is recorded, the apparatus communication unit may receive, from the sensor communication unit, a diagnosis result indicating whether the external sensor is faulty, the control apparatus may further include a sensor failure diagnosis unit diagnosing whether the external sensor is faulty based on the diagnosis result sent from the external sensor and a writing requesting unit, when the external sensor is diagnosed as being faulty by the sensor failure diagnosis unit, outputting a request for recording, as the failure history data, failure information in the failure history recording unit provided in the external sensor diagnosed as being faulty, the apparatus communication unit may receive, from the sensor communication unit, the failure information recorded in the failure history recording unit, and the determination unit may determine whether the faulty sensor is connected to the control apparatus based on the failure information received by the apparatus communication unit.

The external sensor may further include an in-sensor failure diagnosis unit diagnosing whether the external sensor is faulty and a failure history recording unit recording failure information as the failure history data when the external sensor is diagnosed as being faulty by the in-sensor failure diagnosis unit, the apparatus communication unit may receive the failure history data from the sensor communication unit, and the determination unit may determine whether the faulty sensor is connected to the control apparatus based on the failure history data received by the apparatus communication unit.

According to the invention of the present application, it is possible to determine whether a faulty sensor having been diagnosed as being faulty before is connected to the control apparatus.

Other aspects of the invention will become apparent by consideration of the detailed description and accompanying drawings.

BRIEF DESCRIPTION OF THE DRAWINGS

FIG. 1 is a diagram illustrating the structure of an air bag control system (an air bag ECU and external sensors) according to an embodiment of the invention of the present application.

FIG. 2 is a diagram illustrating the functional blocks of an air bag control system (an air bag ECU and external sensors) according to a first embodiment.

FIG. 3 is a flowchart for the air bag control system (an air bag ECU and external sensors) according to the first embodiment.

FIG. 4 is a diagram illustrating the functional blocks of an air bag control system (an air bag ECU and external sensors) according to a second embodiment.

FIG. 5 is a flowchart for the air bag control system (an air bag ECU and external sensors) according to the second embodiment.

FIG. 6 is a diagram illustrating the functional blocks of an air bag control system (an air bag ECU and external sensors) according to a third embodiment.

FIG. 7 is a flowchart for the air bag control system (an air bag ECU and external sensors) according to the third embodiment.

FIG. 8 is a diagram illustrating the functional blocks of an air bag control system (an air bag ECU and external sensors) according to a fourth embodiment.

FIG. 9 is a flowchart for the air bag control system (an air bag ECU and external sensors) according to the fourth embodiment.

FIG. 10 is a diagram illustrating the functional blocks of an air bag control system (an air bag ECU and external sensors) according to a fifth embodiment.

FIG. 11 is a flowchart for the air bag control system (an air bag ECU and external sensors) according to the fifth embodiment.

FIG. 12 is a diagram illustrating the functional blocks of an air bag control system (an air bag ECU, external sensors, and a failure diagnosis apparatus) according to a sixth embodiment.

FIG. 13 is a flowchart for the air bag control system (an air bag ECU, external sensors, and a failure diagnosis apparatus) according to the sixth embodiment.

FIG. 14 is a diagram illustrating the functional blocks of an air bag control system (an air bag ECU, external sensors, and a failure diagnosis apparatus) according to a seventh embodiment.

FIG. 15 is a diagram illustrating the functional blocks of a control system for protecting pedestrians.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A control apparatus (air bag ECU) and an air bag control system according to an embodiment of the invention of the present application will be described below with reference to the drawings. FIG. 1 illustrates the structure of the air bag control system (air bag ECU and external sensors) according to the embodiment of the invention of the present application.

An air bag control system 1000 according to the embodiment monitors sensing data detected by various types of acceleration sensors (external sensors) provided in a vehicle and, when determining that the vehicle collides, improves the safety of passengers in the vehicle or pedestrians by expanding the air bags for the driver seat, passenger seat, and other portions or by lifting the hood of the vehicle. An example of a protective apparatus expanding the air bags for the driver seat, passenger seat, and other portions will be described below.

As illustrated in FIG. 1, the air bag control system 1000 includes an air bag ECU (control apparatus) 100, a passenger seat passenger sensing ECU 200, a meter ECU 300, a battery power supply (the first power supply) 400, and an ignition switch 410.

In addition, the air bag control system 1000 includes a driver seat air bag squib 500, a passenger seat air bag squib 510, a right side air bag squib 520, a left side air bag squib 530, a right curtain air bag squib 540, and a left curtain air bag squib 550.

In addition, the air bag control system 1000 includes a front right acceleration sensor 600, a front left acceleration sensor 610, a right side acceleration sensor 620, a left side acceleration sensor 630, a right side pressure sensor 640, and a left side pressure sensor 650 as external sensors. The places and the number of external sensors installed are not limited to the present embodiment and are arbitrary. In addition, the air bag control system 1000 includes a failure diagnosis apparatus (diagnosis tester) 700 and an air bag warning lamp 800. Components of the air bag control system 1000 will be described below.

The battery power supply 400 is one of various types of storage batteries such as a lead-acid battery installed in a vehicle. The battery power supply 400 directly supplies a power source to the meter ECU 300 via a power line 405 and directly supplies a power source to various types of other components of a vehicle via the power line 405.

The ignition switch 410 starts up or stops the engine of a vehicle. In a state in which the engine of a vehicle is stopped, the ignition switch 410 is OFF. When the user turns the key in this state, the ignition switch 410 is turned ON. When the ignition switch 410 is turned ON, the battery power supply 400 supplies a power source to the meter ECU 300, the passenger seat passenger sensing ECU 200, and the air bag ECU 100 via a power line 407.

The meter ECU 300 is a control apparatus that detects and records the vehicle speed of a vehicle and sends the recorded vehicle speed to the air bag ECU 100 or other components of the vehicle. The meter ECU 300 sends the recorded vehicle speed to the air bag ECU 100 via a CAN communication line 430. Accordingly, the air bag ECU 100 can detect the operational state of the vehicle (such as, for example, the brake state of the vehicle and the like).

The passenger seat passenger sensing ECU 200 detects the weight applied to the passenger seat of the vehicle to determine the passenger state of the passenger seat: for example, a grown-up man, small woman, child, or vacant seat. The passenger seat passenger sensing ECU 200 sends the determined passenger state of the passenger seat to the air bag ECU 100 via a communication line 440. The air bag ECU 100 can suppress the expansion of the air bag (not illustrated) of the passenger seat when, for example, the passenger is a child during a front collision of the vehicle by monitoring, for example, the passenger state of the passenger seat.

The air bag ECU 100 includes a voltage detector 101, the voltage boosting circuit 102, a voltage detector 103, a capacitor 104, voltage detection I/Fs 105 and 107, a DC-DC converter 106, a CAN (Controller Area Network) communication transceiver 108, and a K-line communication driver 110. In addition, the air bag ECU 100 includes an MCU (Micro Controller Unit) 120, an ASIC (Application Specific Integrated Circuit) 140, an acceleration sensor 150, a nonvolatile memory 160, and the lamp driving circuit 180.

The voltage detector 101 detects the value of a power voltage supplied from the battery power supply 400 to the air bag ECU 100 via the ignition switch 410. That is, the voltage detector 101 detects the voltage of a power source supplied to passenger seat passenger sensing ECU 200 and the meter ECU 300.

The voltage detection I/F (Interface) 105 outputs a voltage signal detected by the voltage detector 101 to the MCU 120. The voltage signal detected by the voltage detector 101 is output to the MCU 120 via the voltage detection I/F 105.

The voltage boosting circuit 102 boosts the power voltage supplied from the battery power supply 400 to the air bag ECU 100 via the ignition switch 410. The voltage boosting circuit 102 boosts, for example, a supplied power voltage from 9V to 16V to approximately 24V. The voltage boosting circuit 102 supplies the boosted voltage to the capacitor 104 and the DC-DC converter 106.

The voltage detector 103 detects the power voltage value output from the voltage boosting circuit 102.

The voltage detection I/F 107 outputs a voltage signal detected by the voltage detector 103 to the MCU 120. The voltage signal detected by the voltage detector 103 is output to the MCU 120 via the voltage detection I/F 107.

The capacitor 104 charges or discharges a voltage supplied from the voltage boosting circuit 102 and is a backup power supply for the battery power supply 400.

The DC-DC converter 106 converts (drops) a voltage supplied from the voltage boosting circuit 102 to a voltage (for example, 5V) used by the MCU 120. The DC-DC converter 106 supplies the dropped voltage to the MCU 120.

The CAN communication transceiver 108 is an interface that exchanges data with the meter ECU 300 and other ECUs (not illustrated) of the vehicle via the CAN communication line 430 based on the CAN standard. The data received by the CAN communication transceiver 108 is sent to the MCU 120.

The K-line communication driver 110 is an interface that exchanges data with the passenger seat passenger sensing ECU 200 via the communication line 440. The K-line communication driver 110 converts the voltage level of a communication signal. For example, the K-line communication driver 110 converts a 5V signal level handled by the MCU 120 into a K-line voltage level (12V).

The MCU 120 includes an A/D (Analog to Digital Converter) 121, a CPU (Central Processing Unit) 122, a ROM (Read Only Memory) 124, a RAM (Random Access Memory) 126, and a CAN communication controller 128. In addition, the MCU 120 includes an SCI (Serial Communication Interface) 132, SPIs (Serial Peripheral Interface) 134, 136, and 138, and an IOPort 139.

The A/D 121, the CPU 122, the ROM 124, the RAM 126, the CAN communication controller 128, the SCI 132, the SPIs 134, 136, and 138, and the IOPort 139 are interconnected via an internal bus 170 of the MCU 120.

The A/D 121 converts an analog voltage signal input via the voltage detection I/Fs 105 and 107 into a digital voltage signal.

The CPU 122 is a calculation processing unit executing various types of programs stored in the ROM 124 or the RAM 126. The CPU 122 performs various types of functions of the air bag ECU 100 by executing various types of programs stored in the ROM 124 or the RAM 126. Details on various types of functions of the air bag ECU 100 will be described later.

The ROM 124 is a memory storing data for performing various types of functions of the air bag ECU 100 and various types of programs for performing various types of functions of the air bag ECU 100.

The RAM 126 is a relatively small capacity memory that can be accessed at high speed and stores calculation results and the like of programs executed by the CPU 122 among various types of programs stored in the ROM 124.

The CAN communication controller 128 communicates with the meter ECU 300 or other components of the vehicle via the CAN communication transceiver 108.

The SCI 132 is an asynchronous serial communication interface between a K-line communication driver 110 and devices in the MCU 120.

The SPI 134 is a clock synchronous serial communication interface between the ASIC 140 and devices in the MCU 120. The SPI 136 is an interface between the acceleration sensor 150 and devices in the MCU 120. The SPI 138 is an interface between the non-volatile memory 160 and devices in the MCU 120. The IOPort 139 is an interface between the lamp driving circuit 180 and devices the MCU 120.

The acceleration sensor 150 detects acceleration in a place in which the air bag ECU 100 is disposed. The acceleration sensor 150 outputs the detected acceleration to the MCU 120 via the SPI 136.

The non-volatile memory 160 holds a record without receiving a power source and is, for example, an EEPROM (Electrically Erasable Programmable Read-Only Memory). The non-volatile memory 160 records data output from, for example, the MCU 120 via the SPI 138.

The ASIC 140 is an integrated circuit in which circuits having a plurality of functions are integrated into one. The ASIC 140 includes the squib I/F (Interface) 142 and a sensor I/F 144.

The squib I/F 142 is an interface through which an air bag expansion signal is sent to the driver seat air bag squib 500, the passenger seat air bag squib 510, the right side air bag squib 520, the left side air bag squib 530, the right curtain air bag squib 540, and the left curtain air bag squib 550.

The sensor I/F 144 is an interface through which an acceleration signal and pressure signal sent from the front right acceleration sensor 600, the front left acceleration sensor 610, the right side acceleration sensor 620, the left side acceleration sensor 630, the right side pressure sensor 640, and the left side pressure sensor 650 are received.

When, for example, a faulty sensor installed in the air bag ECU 100 is determined not to be replaced, the lamp driving circuit 180 issues a warning about the fact via the air bag warning lamp 800.

The driver seat air bag squib 500 flows a current through an ignition apparatus (squib) on the driver seat side based on an expansion signal sent from the MCU 120 via the squib I/F 142, generates high-pressure gas by igniting a gas generation agent, and expands the air bag instantaneously.

In addition, the passenger seat air bag squib 510, the right side air bag squib 520, the left side air bag squib 530, the right curtain air bag squib 540, and the left curtain air bag squib 550 also expand air bags disposed in the corresponding places based on the expansion signal sent from the MCU 120.

The front right acceleration sensor 600, which is disposed on the right side on the front of the vehicle, detects the acceleration, and sends the detected acceleration to the MCU 120 via the sensor I/F 144.

Similarly, the front left acceleration sensor 610, the right side acceleration sensor 620, and the left side acceleration sensor 630, which are disposed in the corresponding places in the vehicle, detect the accelerations in the corresponding places and send the detected accelerations to the MCU 120.

The right side pressure sensor 640, which is installed inside the door on the right side of the vehicle, detects a sudden change in the atmospheric pressure inside the door that occurs during a side collision of the vehicle. The right side pressure sensor 640 detects the atmospheric pressure or the change rate of the atmospheric pressure inside the door in which the sensor is disposed, and sends the detected value to the MCU 120 via the sensor I/F 144.

The left side pressure sensor 650, which is installed inside the door on the left side of the vehicle, detects a sudden change in the atmospheric pressure inside the door that occurs during a side collision of the vehicle. The left side pressure sensor 650 detects the atmospheric pressure or the change rate of the atmospheric pressure inside the door in which the sensor is disposed, and sends the detected value to the MCU 120 via the sensor I/F 144.

The failure diagnosis apparatus 700 can communicate with ECUs on the network via a CAN communication line, which is a communication network of the vehicle. The ECUs monitor the presence or absence of their own failures. The failure diagnosis apparatus 700 is used in the assembly line for vehicles, the selling office of vehicles, the repair plant of vehicles, or the like to monitor the presence or absence of a failure in the ECUs and, if a failure is present, identify the portion having the failure.

The air bag warning lamp 800 is driven by the lamp driving circuit 180 or the like when, for example, the determination is performed that a faulty sensor installed in the air bag ECU 100 is not replaced, to warn the user of the fact.

Next, the function blocks of an external sensor and an air bag ECU according to a first embodiment will be described. FIG. 2 illustrates the function blocks of an air bag control system (air bag ECU and external sensor) according to the first embodiment. In the following embodiments, the front right acceleration sensor 600 will be described as an example of the external sensor. However, it is assumed that the other external sensors (the front left acceleration sensor 610, the right side acceleration sensor 620, the left side acceleration sensor 630, the right side pressure sensor 640, and the left side pressure sensor 650) have the same structure and a plurality of external sensors are connected to the air bag ECU 100. The method for connecting external sensors to the air bag ECU 100 is not particularly limited and application to the peer-to-peer method, bus connections (parallel connection and daisy chain connection), and the like is enabled.

As illustrated in FIG. 2, the front right acceleration sensor 600 includes a sensor communication unit 601, a sensor ID recording unit 602, and an impact detection unit 603.

The sensor communication unit 601 communicates with the air bag ECU 100. The sensor ID recording unit 602 is a memory in which identification data (individual identifying ID) for individually identifying the front right acceleration sensor 600 and is configured by a non-volatile memory. Identification data (individual identifying ID) represents data that can be used to uniquely identify an external sensor. As identification data, unique data is written in the production line when an external sensor is manufactured. The impact (acceleration) detection unit 603 is a sensor detecting the data (acceleration or impact value) used to determine whether a protective apparatus such as an air bag is activated.

On the other hand, the air bag ECU 100 includes an ECU communication unit 181, a faulty sensor mount determination unit 182, a first sensor failure diagnosis unit 183-1, a faulty sensor ID recording unit 184, and an installed sensor ID recording unit 185.

The ECU communication unit 181 communicates with the front right acceleration sensor 600. The ECU communication unit 181 is achieved by, for example, the SPI 134, the sensor I/F 144, and the like, but the invention is not limited to this.

The ECU communication unit 181 receives sensing data detected by the impact detection unit 603 and identification data recorded in the sensor ID recording unit. 602 from the sensor communication unit 601.

The faulty sensor mount determination unit 182 determines whether a faulty sensor having been diagnosed as being faulty before is connected to the air bag ECU 100 based on failure history data indicating whether the external sensor has been diagnosed as being faulty before. Although the faulty sensor mount determination unit 182 is achieved by, for example, the CPU 122, the invention is not limited to this.

The first sensor failure diagnosis unit 183-1 diagnoses whether the external sensor (the external sensor currently connected to the air bag ECU 100) is faulty based on the received sensing data. When, for example, the sensing data detected by the impact detection unit 603 is kept at an abnormal value for a predetermined time period such as being fixed to a high value outside the normal range for a predetermined time period or being fixed to a low value outside the normal range for a predetermined time period, the first sensor failure diagnosis unit 183-1 diagnoses the front right acceleration sensor 600 as being faulty. The first sensor failure diagnosis unit 183-1 is achieved by, for example, the CPU 122, but the invention is not limited to this.

The faulty sensor ID recording unit 184 is a memory in which the identification data of an external sensor diagnosed as being faulty by the first sensor failure diagnosis unit 183-1 is recorded as failure history data. The faulty sensor ID recording unit 184 is achieved by the non-volatile memory 160. The installed sensor ID recording unit 185 is a memory in which the identification data of the external sensor (installed sensor) currently connected to the air bag ECU 100 is recorded. The installed sensor ID recording unit 185 is achieved by, for example, the RAM 126, but the installed sensor ID recording unit 185 is not limited to this.

The faulty sensor mount determination unit 182 compares the identification data (the identification data of an external sensor having been diagnosed as being faulty before) recorded in the faulty sensor ID recording unit 184 with the identification data (the identification data of the external sensor currently connected to the air bag ECU 100) received by the ECU communication unit 181 and recorded in the installed sensor ID recording unit 185 and determines whether a faulty sensor is connected to the air bag ECU 100. Specifically, when the identification data recorded in the installed sensor ID recording unit 185 matches any of identification data recorded in the faulty sensor ID recording unit 184, the faulty sensor mount determination unit 182 determines that a faulty sensor is connected to the air bag ECU 100 and, when the identification data does not match any of identification data, determines that a faulty sensor is not connected to the air bag ECU 100.

Next, the operation of an air bag control system according to the first embodiment will be described. FIG. 3 is a flowchart for the air bag control system (air bag ECU and external sensor) according to the first embodiment.

FIG. 3A is a flowchart illustrating the entire process of the air bag control system according to the first embodiment, FIG. 3B is a flowchart concerning the initialization processing of the air bag control system according to the first embodiment, and FIG. 3B is a flowchart concerning the normal processing of the air bag control system according to the first embodiment.

As illustrated in FIG. 3A, the air bag control system 1000 first performs initialization processing (step S100) when, for example, the ignition switch of a vehicle is turned on and then repeats normal processing (step S200).

The initialization processing (step S100) will be described in detail. As illustrated in FIG. 3B, the sensor communication unit 601 sends the individual identifying ID of the front right acceleration sensor 600 recorded in the sensor ID recording unit 602 to the air bag ECU 100 (step S101). When the individual identifying ID cannot be sent from the sensor communication unit 601 to the air bag ECU 100 at a time because, for example, the data length of the individual identifying ID is long, the individual identifying ID may be sent at a plurality of divided times. The individual identifying ID is not necessary for the operation of the air bag ECU 100 during normal time and the individual identifying ID only needs to be received by the air bag ECU 100 only once during startup when an IGN power source is supplied, so the individual identifying ID is desirably executed in initialization processing.

On the other hand, the ECU communication unit 181 receives the individual identifying ID (step S102). Then, the ECU communication unit 181 writes the received individual identifying ID to the installed sensor ID recording unit 185 as an installed sensor (step S103).

Then, the faulty sensor mount determination unit 182 determines whether the same individual identifying ID as the installed sensor is recorded in the faulty sensor ID recording unit 184 (step S104). If the same individual identifying ID as the installed sensor is not recorded in the faulty sensor ID recording unit 184 (No in step S104), the faulty sensor mount determination unit 182 completes the processing.

In contrast, if the same individual identifying ID as the installed sensor is recorded in the faulty sensor ID recording unit 184 (Yes in step S104), the faulty sensor mount determination unit 182 determines that the faulty sensor is connected to the air bag ECU 100 (that is, the faulty sensor installed in the air bag ECU 100 is not replaced (step S105)), the faulty sensor mount determination unit 182 completes the processing. When determining that the faulty sensor installed in the air bag ECU 100 is not replaced, the faulty sensor mount determination unit 182 can output the fact as a warning using the air bag warning lamp 800 or stop the function of the air bag ECU 100.

Next, normal processing (step S200) will be described in detail. As illustrated in FIG. 3C, the sensor communication unit 601 sends the impact value detected by the impact detection unit 603 to the air bag ECU 100 (step S201).

In response to this, the ECU communication unit 181 receives the impact value (step S202). Then, the first sensor failure diagnosis unit 183-1 determines whether the impact value received by the ECU communication unit 181 falls outside the normal range and is kept for a predetermined time (step S203).

When the impact value received by the ECU communication unit 181 does not fall outside the normal range or is not kept for a predetermined time (No in step S203), the first sensor failure diagnosis unit 183-1 completes the processing.

In contrast, when the impact value received by the ECU communication unit 181 falls outside the normal range and is kept for a predetermined time (Yes in step S203), the first sensor failure diagnosis unit 183-1 determines that the installed sensor is a faulty sensor (step S204).

That is, the first sensor failure diagnosis unit 183-1 monitors the impact value received from an external sensor and diagnoses whether the external sensor is normal. Specifically, when the received impact value is a high value outside the normal range or a low value outside the normal range and is kept for a predetermined time or more, the first sensor failure diagnosis unit 183-1 determines that there is an internal abnormality and the external sensor is a faulty sensor. The time required for determining a failure is desirably longer than the time until an impact value changes due to a collision of a vehicle. The normal range of an impact value and the time required for determining to a failure are set to appropriate values depending on the reliability needed for the air bag ECU 100 and the reliability of components to be adopted.

Then, the first sensor failure diagnosis unit 183-1 records the individual identifying ID of the installed sensor in the faulty sensor ID recording unit 184 (step S205) and completes the processing. After receiving an impact value, the ECU communication unit 181 performs processing such as determination as to whether the air bag is expanded based on the received impact value. However, the detailed description is omitted.

According to the first embodiment, since the individual identifying ID of an external sensor diagnosed as being faulty is recorded in the faulty sensor ID recording unit 184, by comparing this individual identifying ID with the individual identifying ID of the external sensor currently connected to the air bag ECU 100, a determination can be made as to whether a faulty sensor having been diagnosed as being faulty before is connected to the air bag ECU 100.

Next, the functional blocks of an external sensor and an air bag ECU according to a second embodiment will be described. FIG. 4 is a diagram illustrating the functional blocks of an air bag control system (air bag ECU and external sensor) according to the second embodiment. The detailed description of components that are the same as in the first embodiment is omitted.

The front right acceleration sensor 600 includes the sensor communication unit 601, the sensor ID recording unit 602, the impact detection unit 603, and an in-sensor failure diagnosis unit 604.

The in-sensor failure diagnosis unit 604 diagnoses whether the front right acceleration sensor 600 is faulty. The in-sensor failure diagnosis unit 604 determines whether the impact value normally exceeds a predetermined threshold by, for example, physically operating the element of the sensing part of the impact detection unit 603 to the plus side and the minus side. When the impact value does not exceed the predetermined threshold, the in-sensor failure diagnosis unit 604 diagnoses the external sensor as having any failure and determines it to be a faulty sensor. In contrast, when the impact value exceeds the predetermined threshold, the in-sensor failure diagnosis unit 604 determines the external sensor to be normal.

The air bag ECU 100 includes the ECU communication unit 181, the faulty sensor mount determination unit 182, the faulty sensor ID recording unit 184, the installed sensor ID recording unit 185, and a second sensor failure diagnosis unit 183-2.

The ECU communication unit 181 receives, from the sensor communication unit 601, a diagnosis result (for example, failure information indicating the external sensor to be faulty) diagnosed by the in-sensor failure diagnosis unit 604 and identification data recorded in the sensor ID recording unit 602. In addition, the ECU communication unit 181 also receives sensing data detected by the impact detection unit 603.

The second sensor failure diagnosis unit 183-2 diagnoses whether the front right acceleration sensor 600 is faulty based on the diagnosis result sent from the front right acceleration sensor 600.

The faulty sensor ID recording unit 184 records, as failure history data, the identification data of the external sensor diagnosed as being faulty by the second sensor failure diagnosis unit 183-2.

The faulty sensor mount determination unit 182 compares the identification data (the identification data of the external sensor having been diagnosed as being faulty before) recorded in the faulty sensor ID recording unit 184 with the identification data (the identification data of the external sensor currently connected to the air bag ECU 100) received by the ECU communication unit 181 and recorded in the installed sensor ID recording unit 185 and determines whether a faulty sensor is connected to the air bag ECU 100. Specifically, when the identification data recorded in the installed sensor ID recording unit 185 matches any of identification data recorded in the faulty sensor ID recording unit 184, the faulty sensor mount determination unit 182 determines that a faulty sensor is connected to the air bag ECU 100 and, when the identification data does not match any of identification data, determines that a faulty sensor is not connected to the air bag ECU 100.

Next, the operation of an air bag control system according to the second embodiment will be described. FIG. 5 is a flowchart for the air bag control system (air bag ECU and external sensor) according to the second embodiment. The flowchart illustrating the entire process of the air bag control system 1000 according to the second embodiment is the same as in the first embodiment (FIG. 3A). The flowchart concerning the initialization processing of the air bag control system according to the second embodiment is also the same as in the first embodiment (FIG. 3B). Accordingly, only the flowchart concerning the normal processing of the air bag control system according to the second embodiment will be described.

As illustrated in FIG. 5, the in-sensor failure diagnosis unit 604 performs internal failure diagnosis (step S211). Then, the in-sensor failure diagnosis unit 604 determines whether the result of the internal failure diagnosis indicates a failure (step S212).

If the result of the internal failure diagnosis is determined to be a failure (Yes in step S212), the sensor communication unit 601 sends failure information indicating that the external sensor is faulty to the air bag ECU 100 (step S213).

In contrast, if the result of the internal failure diagnosis is determined not to be a failure (No in step S212), the sensor communication unit 601 sends the impact value detected by the impact detection unit 603 to the air bag ECU 100 (step S214).

After step S213 or step S214, the second sensor failure diagnosis unit 183-2 determines whether the data received from the external sensor is failure information (step S215). If the data received from the external sensor is not failure information (No in step S215), the second sensor failure diagnosis unit 183-2 completes the processing.

In contrast, if the data received from the external sensor is failure information (Yes in step S215), the second sensor failure diagnosis unit 183-2 records the individual identifying ID of the installed sensor in the faulty sensor ID recording unit 184 (step S216) and completes the processing.

According to the second embodiment, by recording the individual identifying ID of the external sensor diagnosed as being faulty by the external sensor in the faulty sensor ID recording unit 184 and comparing this individual identifying ID with the individual identifying ID of the external sensor currently connected to the air bag ECU 100, a determination can be made as to whether a faulty sensor having been diagnosed as being faulty before is connected to the air bag ECU 100.

Next, the functional blocks of an external sensor and an air bag ECU according to a third embodiment will be described. FIG. 6 is a diagram illustrating the functional blocks of an air bag control system (air bag ECU and external sensor) according to the third embodiment. The detailed description of components that are the same as in the first or second embodiment is omitted.

The front right acceleration sensor 600 includes the sensor communication unit 601, the impact detection unit 603, and a failure history recording unit 605.

The failure history recording unit 605 is a memory in which the failure history data of the failure history recording unit 605 is recorded and is configured by a non-volatile memory.

On the other hand, the air bag ECU 100 includes the ECU communication unit 181, the faulty sensor mount determination unit 182, the first sensor failure diagnosis unit 183-1, and a writing requesting unit 186.

The ECU communication unit 181 receives, from the sensor communication unit 601, the sensing data detected by the impact detection unit 603.

When the front right acceleration sensor 600 is diagnosed as being faulty by the first sensor failure diagnosis unit 183-1, the writing requesting unit 186 outputs a request for recoding, as failure history data, failure information in the failure history recording unit 605 provided in the front right acceleration sensor 600 diagnosed as being faulty. Accordingly, the failure information is recorded in the failure history recording unit 605.

In the embodiment, the ECU communication unit 181 receives the failure information recorded in the failure history recording unit 605 from the sensor communication unit 601.

Then, the faulty sensor mount determination unit 182 determines whether a faulty sensor is connected to the air bag ECU 100 based on the failure information received by the ECU communication unit 181. For example, if data sent from the external sensor currently connected to the air bag ECU 100 contains failure information, the faulty sensor mount determination unit 182 determines that a faulty sensor is connected to the air bag ECU 100. In contrast, if data sent from the external sensor currently connected to the air bag ECU 100 does not contain failure information, the faulty sensor mount determination unit 182 determines that a faulty sensor is not connected to the air bag ECU 100.

Next, the operation of an air bag control system according to the third embodiment will be described. FIG. 7 is a flowchart for the air bag control system (air bag ECU and external sensor) according to the third embodiment. The flowchart illustrating the entire process of the air bag control system 1000 according to the third embodiment is the same as in the first embodiment (FIG. 3A). Accordingly, only the flowchart concerning the initialization processing of the air bag control system according to the third embodiment and the flowchart concerning the normal processing of the air bag control system according to the third embodiment will be described. FIG. 7A is a flowchart concerning the initialization processing of the air bag control system according to the third embodiment and FIG. 7B is a flowchart concerning the normal processing of the air bag control system according to the third embodiment.

As illustrated in FIG. 7A, the sensor communication unit 601 determines whether the failure history (write history of failure information) of the front right acceleration sensor 600 is present in the failure history recording unit 605 (step S121).

When the failure history of the front right acceleration sensor 600 is present in the failure history recording unit 605 (Yes in step S121), the sensor communication unit 601 sends a signal indicating the presence of internal failure history to the air bag ECU 100 (step S122).

In contrast, when the failure history of the front right acceleration sensor 600 is absent in the failure history recording unit 605 (No in step S121), the sensor communication unit 601 sends a signal indicating the absence of internal failure history to the air bag ECU 100 (step S123)

After step S122 or step S123, the faulty sensor mount determination unit 182 determines whether the received data from the external sensor is a signal (failure information) indicating the presence of an internal failure (step S124).

When the received data from the external sensor is not a signal (failure information) indicating the presence of an internal failure (No in step S124), the faulty sensor mount determination unit 182 completes the processing.

In contrast, when the received data from the external sensor is a signal (failure information) indicating the presence of an internal failure (Yes in step S124), the faulty sensor mount determination unit 182 determines that a faulty sensor is connected to the air bag ECU 100 (that is, the faulty sensor installed in the air bag ECU 100 is not replaced (step S125)) and completes the processing. When determining that the faulty sensor installed in the air bag ECU 100 is not replaced, the faulty sensor mount determination unit 182 can output the fact as a warning using the air bag warning lamp 800 or stop the function of the air bag ECU 100.

Next, normal processing (step S200) will be described in detail. As illustrated in FIG. 7B, the sensor communication unit 601 sends the impact value detected by the impact detection unit 603 to the air bag ECU 100 (step S221).

Then, the ECU communication unit 181 receives the impact value (step S222). Then, the first sensor failure diagnosis unit 183-1 determines whether the impact value received by the ECU communication unit 181 falls outside the normal range and is kept for a predetermined time (step S223).

When the impact value received by the ECU communication unit 181 does not fall outside the normal range or is not kept for a predetermined time (No in step S223), the first sensor failure diagnosis unit 183-1 completes the processing.

In contrast, when the impact value received by the ECU communication unit 181 falls outside the normal range and is kept for a predetermined time (Yes in step S223), the first sensor failure diagnosis unit 183-1 determines that the installed sensor is a faulty sensor (step S224).

Then, the writing requesting unit 186 sends failure information to the external sensor diagnosed as being faulty (step S225) and requests the recording of the failure information in the failure history recording unit 605.

In response to this, the sensor communication unit 601 receives the failure information sent from the writing requesting unit 186, records the received failure information in the failure history recording unit 605 (step S226), and completes the processing.

According to the third embodiment, the air bag ECU 100 diagnoses whether an external sensor is faulty and, if a failure is present, records faulty information in the external sensor, so the external sensor holds its own failure history data in the failure history recording unit 605. Since the external sensor sends failure history data to the air bag ECU 100 in initialization processing, the air bag ECU 100 can determine whether a faulty sensor having been diagnosed as being faulty before is connected to the air bag ECU 100 based on the failure history data. According to the third embodiment, since an external sensor has its own failure history data in the failure history recording unit 605, even if a faulty sensor is replaced with a new one and the faulty sensor is erroneously assembled to another vehicle without being discarded in the assembly line for vehicles or the like, the attachment of the faulty sensor can be detected.

Next, the functional blocks of an external sensor and an air bag ECU according to a fourth embodiment will be described. FIG. 8 is a diagram illustrating the functional blocks of an air bag control system (air bag ECU and external sensor) according to the fourth embodiment. The detailed description of components that are the same as in the first to third embodiments is omitted.

The front right acceleration sensor 600 includes the sensor communication unit 601, the impact detection unit 603, the in-sensor failure diagnosis unit 604, and the failure history recording unit 605.

On the other hand, the air bag ECU 100 includes the ECU communication unit 181, the faulty sensor mount determination unit 182, the second sensor failure diagnosis unit 183-2, and the writing requesting unit 186.

The ECU communication unit 181 receives, from the sensor communication unit 601, the diagnosis result (the diagnosis result by the in-sensor failure diagnosis unit 604) indicating whether the front right acceleration sensor 600 is faulty. The ECU communication unit 181 also receives the sensing data detected by the impact detection unit 603.

The second sensor failure diagnosis unit 183-2 diagnoses whether the front right acceleration sensor 600 is faulty based on the diagnosis result sent from the front right acceleration sensor 600.

When the front right acceleration sensor 600 is diagnosed as being faulty by the second sensor failure diagnosis unit 183-2, the writing requesting unit 186 outputs a request for recoding, as failure history data, failure information in the failure history recording unit 605 provided in the front right acceleration sensor 600 diagnosed as being faulty. Accordingly, the failure information is recorded in the failure history recording unit 605.

In the embodiment, the ECU communication unit 181 receives the failure information recorded in the failure history recording unit 605 from the sensor communication unit 601.

Then, the faulty sensor mount determination unit 182 determines whether a faulty sensor is connected to the air bag ECU 100 based on the failure information received by the ECU communication unit 181. For example, if data sent from the external sensor currently connected to the air bag ECU 100 contains failure information, the faulty sensor mount determination unit 182 determines that a faulty sensor is connected to the air bag ECU 100. In contrast, if data sent from the external sensor currently connected to the air bag ECU 100 does not contain failure information, the faulty sensor mount determination unit 182 determines that a faulty sensor is not connected to the air bag ECU 100.

Next, the operation of an air bag control system according to the fourth embodiment will be described. FIG. 9 is a flowchart for the air bag control system (air bag ECU and external sensor) according to the fourth embodiment. The flowchart illustrating the entire process of the air bag control system 1000 according to the fourth embodiment is the same as in the first embodiment (FIG. 3A). The flowchart concerning the initialization processing of the air bag control system 1000 according to the fourth embodiment is also the same as in the third embodiment (FIG. 7A). Accordingly, only the flowchart concerning the normal processing of the air bag control system according to the fourth embodiment will be described.

As illustrated in FIG. 9, the in-sensor failure diagnosis unit 604 performs internal failure diagnosis (step S231). Then, the in-sensor failure diagnosis unit 604 determines whether the result of the internal failure diagnosis indicates a failure (step S232).

If the result of the internal failure diagnosis is determined to be a failure (Yes in step S232), the sensor communication unit 601 sends failure information indicating that the external sensor is faulty to the air bag ECU 100 (step S233).

In contrast, if the result of the internal failure diagnosis is determined not to be a failure (No in step S232), the sensor communication unit 601 sends the impact value detected by the impact detection unit 603 to the air bag ECU 100 (step S234).

After step S233 or step S234, the second sensor failure diagnosis unit 183-2 determines whether the data received from the external sensor is failure information (step S235). If the data received from the external sensor is not failure information (No in step S235), the second sensor failure diagnosis unit 183-2 completes the processing.

In contrast, if the data received from the external sensor is failure information (Yes in step S235), the second sensor failure diagnosis unit 183-2 determines that the installed sensor is a faulty sensor (step S236).

Then, the writing requesting unit 186 sends failure information to the external sensor diagnosed as being faulty (step S237) and requests the recording of the failure information in the failure history recording unit 605.

In response to this, the sensor communication unit 601 receives the failure information sent from the writing requesting unit 186, records the received failure information in the failure history recording unit 605 (step S238), and completes the processing.

According to the fourth embodiment, an external sensor diagnoses whether the external sensor is faulty and, if it is faulty, the failure information is written to the external sensor according to a write request from the air bag ECU 100, so the external sensor holds its failure history data in the failure history recording unit 605. Since the external sensor sends failure history data to the air bag ECU 100 in initialization processing, the air bag ECU 100 can determine whether a faulty sensor having been diagnosed as being faulty before is connected to the air bag ECU 100 based on the failure history data.

Next, the functional blocks of an external sensor and an air bag ECU according to a fifth embodiment will be described. FIG. 10 is a diagram illustrating the functional blocks of an air bag control system (air bag ECU and external sensor) according to the fifth embodiment. The detailed description of components that are the same as in the first to fourth embodiments is omitted.

The front right acceleration sensor 600 includes the sensor communication unit 601, the impact detection unit 603, the in-sensor failure diagnosis unit 604, and the failure history recording unit 605.

The in-sensor failure diagnosis unit 604 diagnoses whether the front right acceleration sensor 600 is faulty. The in-sensor failure diagnosis unit 604 determines whether the impact value normally exceeds a predetermined threshold by, for example, physically operating the element of the sensing part of the impact detection unit 603 to the plus side and the minus side. When the impact value does not exceed the predetermined threshold, the in-sensor failure diagnosis unit 604 diagnoses the external sensor as having any failure and determines it to be a faulty sensor. In contrast, when the impact value exceeds the predetermined threshold, the in-sensor failure diagnosis unit 604 determines the external sensor to be normal. In addition, when diagnosing that the front right acceleration sensor 600 as being faulty, the in-sensor failure diagnosis unit 604 records, as failure history data, failure information in the failure history recording unit 605.

On the other hand, the air bag ECU 100 includes the ECU communication unit 181 and the faulty sensor mount determination unit 182.

The ECU communication unit 181 receives, from the sensor communication unit 601, the failure history data recorded in the failure history recording unit 605.

The faulty sensor mount determination unit 182 determines whether a faulty sensor is connected to the air bag ECU 100 based on the failure history data received by the ECU communication unit 181. For example, if failure history data sent from the external sensor currently connected to the air bag ECU 100 contains failure information, the faulty sensor mount determination unit 182 determines that a faulty sensor is connected to the air bag ECU 100. In contrast, if failure history data sent from the external sensor currently connected to the air bag ECU 100 does not contain failure information, the faulty sensor mount determination unit 182 determines that a faulty sensor is not connected to the air bag ECU 100.

Next, the operation of an air bag control system according to the fifth embodiment will be described. FIG. 11 is a flowchart for the air bag control system (air bag ECU and external sensor) according to the fifth embodiment. The flowchart illustrating the entire process of the air bag control system 1000 according to the fifth embodiment is the same as in the first embodiment (FIG. 3A). The flowchart concerning the initialization processing of the air bag control system according to the fifth embodiment is also the same as in the third embodiment (FIG. 7A). Accordingly, only the flowchart concerning the normal processing of the air bag control system according to the fifth embodiment will be described.

As illustrated in FIG. 11, the in-sensor failure diagnosis unit 604 performs internal failure diagnosis (step S241). Then, the in-sensor failure diagnosis unit 604 determines whether the result of the internal failure diagnosis indicates a failure (step S242).

If determining that the result of the internal failure diagnosis to be a failure (Yes in step S242), the in-sensor failure diagnosis unit 604 records failure information in the failure history recording unit 605 (step S243). Then, the sensor communication unit 601 sends failure information indicating that the external sensor is faulty to the air bag ECU 100 (step S244).

In contrast, if the result of the internal failure diagnosis is determined not to be a failure (No in step S242), the sensor communication unit 601 sends the impact value detected by the impact detection unit 603 to the air bag ECU 100 (step S245).

After step S244 or step S245, the faulty sensor mount determination unit 182 determines whether the data received from the external sensor is failure information (step S246). If the data received from the external sensor is not failure information (No in step S246), the faulty sensor mount determination unit 182 completes the processing.

In contrast, if the data received from the external sensor is failure information (Yes in step S246), the faulty sensor mount determination unit 182 determines that the installed sensor us a faulty sensor and the faulty sensor is connected to the air bag ECU 100 (step S247) and completes the processing.

According to the fifth embodiment, an external sensor diagnoses the presence or absence of its own failure and the diagnosis result is recorded in the failure history recording unit 605. Since the external sensor sends failure history data to the air bag ECU 100, the air bag ECU 100 can determine whether a faulty sensor having been diagnosed as being faulty before is connected to the air bag ECU 100 based on the failure history data.

Next, the functional blocks of an external sensor, an air bag ECU, and a failure diagnosis apparatus according to a sixth embodiment will be described. FIG. 12 is a diagram illustrating the functional blocks of an air bag control system (air bag ECU, external sensor, and failure diagnosis apparatus) according to the sixth embodiment. The detailed description of components that are the same as in the first to fifth embodiments is omitted.

The front right acceleration sensor 600 includes the sensor communication unit 601, the sensor ID recording unit 602, and the impact detection unit 603.

On the other hand, the air bag ECU 100 includes the ECU communication unit 181, the faulty sensor mount determination unit 182, the first sensor failure diagnosis unit 183-1, the faulty sensor ID recording unit 184, the installed sensor ID recording unit 185, and an ECU second communication unit 187.

The ECU second communication unit 187 communicates with the failure diagnosis apparatus (diagnosis tester) 700. The ECU second communication unit 187 is achieved by, for example, the CAN communication controller 128 and the like, but the invention is not limited to this.

The failure diagnosis apparatus 700 includes a failure diagnosis apparatus communication unit 710, an installed sensor ID reading unit 720, a faulty sensor ID reading unit 730, and a display unit 740.

The failure diagnosis apparatus communication unit 710 communicates with the air bag ECU 100. The installed sensor ID reading unit 720 reads identification data (individual identifying ID) for individually identifying the external sensor currently connected to the air bag ECU 100 via the failure diagnosis apparatus communication unit 710. The faulty sensor ID reading unit 730 reads identification data for individually identifying a faulty sensor via the failure diagnosis apparatus communication unit 710. The display unit 740 is an output interface displaying the individual identifying ID of the external sensor currently connected to the air bag ECU 100 and the individual identifying ID of a faulty sensor read by the faulty sensor ID reading unit 730.

Next, the operation of an air bag control system according to the sixth embodiment will be described. FIG. 13 is a flowchart for the air bag control system (air bag ECU, external sensor, and failure diagnosis apparatus) according to the sixth embodiment.

FIG. 13A is a flowchart illustrating the entire process of the air bag control system according to the sixth embodiment and FIG. 13B is a flowchart concerning the failure diagnosis apparatus communication processing of the air bag control system according to the sixth embodiment.

The flowchart concerning the initialization processing of the air bag control system according to the sixth embodiment is the same as in the first embodiment (FIG. 3B). The flowchart concerning the normal processing of the air bag control system according to the sixth embodiment is the same as in the first embodiment (FIG. 3C). Accordingly, only the flowchart illustrating the entire process of the air bag control system according to the sixth embodiment and the flowchart concerning failure diagnosis apparatus communication processing will be described.

As illustrated in FIG. 13A, the air bag control system 1000 first performs initialization processing (step S100) when, for example, the ignition switch of the vehicle is turned on. Then, the air bag control system 1000 performs normal processing (step S200) and then performs failure diagnosis apparatus communication processing (step S300). The air bag control system 1000 repeats normal processing (step S200) and failure diagnosis apparatus communication processing (step S300).

In addition, as illustrated in FIG. 13B, the ECU second communication unit 187 determines whether the failure diagnosis apparatus 700 is connected (step S301). If the failure diagnosis apparatus 700 is not connected (No in step S301), the ECU second communication unit 187 completes the processing.

In contrast, if the failure diagnosis apparatus 700 is connected (Yes in step S301), the installed sensor ID reading unit 720 requests the air bag ECU 100 to indicate the individual identifying ID of the sensor currently connected, via the failure diagnosis apparatus communication unit 710 (step S302).

Then, the ECU second communication unit 187 reads, from the installed sensor ID recording unit 185, the individual identifying ID of the sensor currently connected and sends it to the failure diagnosis apparatus 700 (step S303).

Then, the display unit 740 displays the individual identifying ID (read by the installed sensor ID reading unit 720) of the sensor currently connected (step S304).

Then, the faulty sensor ID reading unit 730 requests the air bag ECU 100 to indicate whether a faulty sensor is connected (step S305).

Then, the faulty sensor mount determination unit 182 sends a signal indicating whether a faulty sensor is connected to the failure diagnosis apparatus 700 via the ECU second communication unit 187 (step S306).

Then, the faulty sensor ID reading unit 730 determines whether a faulty sensor is connected based on the signal (sent by the faulty sensor mount determination unit 182) indicating whether a faulty sensor is connected (step S307). If determining that a faulty sensor is not connected (No in step S307), the faulty sensor ID reading unit 730 completes the processing.

In contrast, when determining that a faulty sensor is connected (Yes in step S307), the faulty sensor ID reading unit 730 requests the air bag ECU to indicate the individual identifying ID of the faulty sensor (step S308).

Then, the faulty sensor mount determination unit 182 sends the individual identifying ID of the faulty sensor to the failure diagnosis apparatus 700 via the ECU second communication unit 187 (step S309).

Then, the display unit 740 displays the individual identifying ID of the faulty sensor read by the faulty sensor ID reading unit 730 (step S310).

According to the sixth embodiment, the individual identifying ID of the external sensor connected to the air bag ECU 100 can be read from the failure diagnosis apparatus 700 via the communication network of the vehicle. In addition, the individual identifying ID of the external sensor held by the air bag ECU 100, and the presence or absence or the individual identifying ID of an external sensor having been determined to be faulty before can be read from the failure diagnosis apparatus 700 via communication.

In addition, according to the sixth embodiment, the external sensor currently assembled to the vehicle can be individually identified in the assembly line for vehicles. Accordingly, although the traceability of the vehicle and the external sensor is ensured conventionally by performing work such as the reading of a barcode label attached to an external sensor using a barcode reader, by abolishing the reading work using a barcode reader in the assembly line for vehicles, the assembling time of the vehicle can be shortened. In addition, since the barcode label attached to the external sensor becomes unnecessary, the cost of the barcode label can be reduced. In addition, since the work of attaching a barcode becomes unnecessary in manufacturing an external sensor, the time required for manufacturing an external sensor can be shortened. In addition, since the external sensor having been determined to be faulty before can be individually identified in the assembly line for vehicles, it is possible to surely prevent faulty products from being on the market.

Next, the functional blocks of an external sensor, an air bag ECU, and a failure diagnosis apparatus according to a seventh embodiment will be described. FIG. 14 is a diagram illustrating the functional blocks of an air bag control system (air bag ECU, external sensor, and failure diagnosis apparatus) according to the seventh embodiment. The detailed description of components that are the same as in the first to sixth embodiments is omitted.

The front right acceleration sensor 600 includes the sensor communication unit 601, the sensor ID recording unit 602, the impact detection unit 603, and the in-sensor failure diagnosis unit 604.

On the other hand, the air bag ECU 100 includes the ECU communication unit 181, the faulty sensor mount determination unit 182, the second sensor failure diagnosis unit 183-2, the faulty sensor ID recording unit 184, the installed sensor ID recording unit 185, and the ECU second communication unit 187.

In addition, the failure diagnosis apparatus 700 includes the failure diagnosis apparatus communication unit 710, the installed sensor ID reading unit 720, the faulty sensor ID reading unit 730, and the display unit 740.

The flowchart illustrating the entire process of the air bag control system according to the seventh embodiment is the same as in the sixth embodiment (FIG. 13A). The flowchart concerning the initialization processing of the air bag control system according to the seventh embodiment is also the same as in the first embodiment (FIG. 3B). The flowchart concerning the normal processing of the air bag control system according to the seventh embodiment is also the same as in the second embodiment (FIG. 5). The flowchart concerning the failure diagnosis communication processing of the air bag control system according to the seventh embodiment is the same as in the sixth embodiment (FIG. 13B).

According to the seventh embodiment, as in the sixth embodiment, the individual identifying ID of the external sensor connected to the air bag ECU 100 can be read from the failure diagnosis apparatus 700 via the communication network of the vehicle. In addition, the individual identifying ID of the external sensor held by the air bag ECU 100, and the presence or absence or the individual identifying ID of an external sensor having been determined to be faulty before can be read from the failure diagnosis apparatus 700 via communication.

In addition, according to the seventh embodiment, as in the sixth embodiment, the external sensor currently assembled to a vehicle can be individually identified in the assembly line for vehicles. Accordingly, the traceability of the vehicle and the external sensor is ensured conventionally by performing work such as the reading of a barcode label attached to an external sensor using a barcode reader, but the assembling time of the vehicle can be shortened by abolishing the reading work with a barcode reader in the assembly line for vehicles. In addition, since the barcode label attached to the external sensor becomes unnecessary, the cost of the barcode label can be reduced. In addition, since the work of attaching a barcode becomes unnecessary in manufacturing an external sensor, the time required for manufacturing an external sensor can be shortened. In addition, since the external sensor having been determined to be faulty before can be individually identified in the assembly line for vehicles, it is possible to surely prevent faulty products from being on the market.

Although examples of a protective apparatus expanding air bags for driver seat, passenger seat, and other portions have been described in the above embodiments, the invention is not limited to this, and application to a control system for protecting pedestrians is also enabled as described below.

FIG. 15 is a diagram illustrating the functional blocks of a control system for protecting pedestrians. As illustrated in FIG. 15, the control system for protecting pedestrians includes a pedestrian protection ECU 900, a right bumper acceleration sensor 910, a center bumper acceleration sensor 920, a left bumper acceleration sensor 930, a first actuator 940, and a second actuator 950.

The right bumper acceleration sensor 910, the center bumper acceleration sensor 920, and the left bumper acceleration sensor 930 obtain the acceleration when a vehicle collides with a pedestrian and sends the acceleration to the pedestrian protection ECU 900.

The pedestrian protection ECU 900 estimates a collision object based on the data received from the right bumper acceleration sensor 910, the center bumper acceleration sensor 920, and the left bumper acceleration sensor 930 and, if determining that the collision object is a pedestrian, operates the first actuator 940 and the second actuator 950.

For example, in a vehicle having a small clearance between the hood and the engine, the pedestrian protection ECU 900 reduces the disability value of the pedestrian by lifting the hood using the first actuator 940 and the second actuator 950 to increase the clearance between the hood and the engine disposed immediately below the hood. The pedestrian protection ECU 900 also has a function of, for example, covering the wiper and the A-pillar with the air bag expanding outward to prevent the disability value from increasing because the pedestrian collides with the projection disposed at the root of the wiper and the A-pillar.

The pedestrian protection ECU 900 operates the first actuator 940 and the second actuator 950 by, for example, energizing the squib, igniting the inflator to generate gas, and operating the piston by using the generated gas. When there is room for the microcomputer processing capability and memory space, the air bag ECU 100 can be integrated with the pedestrian protection ECU 900.

The invention claimed is:

1. A control apparatus configured to control a human protection system of a vehicle, the control apparatus comprising:
an electronic control unit, the electronic control unit configured to:
communicate with a vehicle sensor for the human protection system of the vehicle, the vehicle sensor located externally to the control apparatus and electrically connected to the control apparatus,
receive identification data for identifying the vehicle sensor,
receive sensing data detected from the vehicle sensor,
diagnose whether the vehicle sensor is faulty based on the sensing data,
in response to the vehicle sensor that is previously connected to the control apparatus being diagnosed as faulty, record, as failure history data, a first identification data of the vehicle sensor diagnosed as faulty,
record a second identification data for identifying the vehicle sensor when the vehicle sensor is currently connected to the control apparatus,
determine that the vehicle sensor currently connected to the control apparatus is faulty when the second recorded identification data for identifying the vehicle sensor currently connected to the control apparatus matches the first identification data previously recorded in the failure history data, and
control to restrict or stop a function of the human protection system, the human protection system including an airbag, a hood lifting mechanism, or both based on the determination that the vehicle sensor currently connected to the control apparatus is faulty.

2. The control apparatus according to claim 1, wherein the electronic control unit is further configured to:
receive, from the vehicle sensor, a diagnosis result indicating whether the vehicle sensor is faulty, and
wherein the electronic control unit diagnoses whether the vehicle sensor is faulty based on the diagnosis result received from the vehicle sensor.

3. The control apparatus according to claim 1, wherein the failure history data is recorded in a failure history memory of the vehicle sensor.

4. The control apparatus according to claim 3, wherein the electronic control unit is further configured to:
output, when the vehicle sensor is diagnosed as being faulty, a request for recording, as the failure history data, failure information in the failure history memory of the vehicle sensor diagnosed as faulty,
receive, from the vehicle sensor, the failure information recorded in the failure history memory of the vehicle sensor, and
wherein the electronic control unit determines whether the vehicle sensor currently connected to the control apparatus has been previously diagnosed by the electronic control unit as being faulty based on the failure information received from the vehicle sensor.

5. The control apparatus according to claim 3, wherein the electronic control unit is further configured to:
receive, from the vehicle sensor, a diagnosis result indicating whether the vehicle sensor is faulty, diagnose whether the vehicle sensor is faulty based on the diagnosis result received from the vehicle sensor, output, when the vehicle sensor is diagnosed as being faulty, a request for recording, as the failure history data, failure information in the failure history memory of the vehicle sensor diagnosed as being faulty, receive, from the vehicle sensor, the failure information recorded in the failure history memory of the vehicle sensor, and wherein the electronic control unit determines whether the vehicle sensor currently connected to the control apparatus has been previously diagnosed by the electronic control unit as being faulty based on the failure information received from the vehicle Sensor.

6. The control apparatus according to claim 3, wherein the electronic control unit is further configured to:

receive the failure history data from the vehicle sensor, and wherein the electronic control unit determines whether the vehicle sensor currently connected to the control apparatus has been previously diagnosed by the electronic control unit as being faulty based on the failure history data received from the vehicle sensor.

7. A control system, the control system comprising:

a human protection system of a vehicle;

a vehicle sensor associated with the human protection system; and a control apparatus configured to control the human protection system and the vehicle sensor, wherein the control apparatus is electrically connected to the vehicle sensor and includes an electronic control unit, the electronic control unit configured to:

communicate with the vehicle sensor, the vehicle sensor located externally to the control apparatus, receive identification data for identifying the vehicle sensor, receive sensing data detected from the vehicle sensor, diagnose whether the vehicle sensor is faulty based on the sensing data, in response to the vehicle sensor that is previously connected to the control apparatus being diagnosed as faulty, record, as failure history data, a first identification data of the vehicle sensor diagnosed as faulty, record a second identification data for identifying the vehicle sensor when the vehicle sensor is currently connected to the control apparatus, determine that the vehicle sensor currently connected to the control apparatus is faulty when the second recorded identification data for identifying the vehicle sensor currently connected to the control apparatus matches the first identification data previously recorded in the failure history data, and control to restrict or stop a function of the human protection system, the human protection system including an airbag, a hood lifting mechanism, or both based on the determination that the vehicle sensor currently connected to the control apparatus is faulty.

8. The control system according to claim 7, wherein the vehicle sensor includes a sensor identification memory configured to record the identification data for identifying the vehicle sensor, and wherein the vehicle sensor is configured to detect the sensing data used to determine whether the human protection system is activated.

9. The control system according to claim 8, further comprising a failure diagnosis apparatus, the failure diagnosis apparatus including:

a first memory configured to read the second recorded identification data for individually identifying the vehicle sensor currently connected to the control apparatus, a second memory configured to read the first recorded identification data of the vehicle sensor diagnosed as being faulty, and a display unit configured to display the identification data for identifying the vehicle sensor currently connected to the control apparatus read by the first memory of the failure diagnosis apparatus and the identification data of the vehicle sensor diagnosed as being faulty read by the second memory of the failure diagnosis apparatus.

10. The control system according to claim 7, wherein the vehicle sensor includes a sensor identification memory configured to record the identification data for identifying the vehicle sensor, and wherein the electronic control unit is configured to diagnose whether the vehicle sensor is faulty, and wherein the electronic control unit is further configured to:

receive, from the vehicle sensor, a diagnosis result, diagnose whether the vehicle sensor is faulty based on the diagnosis result received from the vehicle sensor, and compare the recorded identification data with the received identification data for identifying the vehicle sensor.

11. The control system according to claim 10, further comprising a failure diagnosis apparatus, the failure diagnosis apparatus including:

a first memory configured to read the second recorded identification data for identifying the vehicle sensor currently connected to the control apparatus, a second memory configured to read the first recorded identification data of the vehicle sensor diagnosed as being faulty, and a display unit configured to display the identification data for identifying the vehicle sensor currently connected to the control apparatus read by the first memory of the failure diagnosis apparatus and the identification data of the vehicle sensor diagnosed as being faulty read by the second memory of the failure diagnosis apparatus.

12. The control system according to claim 7, wherein the electronic control unit is configured to determine whether the vehicle sensor currently connected to the control apparatus has been previously diagnosed as being faulty based on the failure history data recorded in a failure history memory of the vehicle sensor.

13. The control system according to claim 12, wherein the vehicle sensor is configured to detect sensing data used to determine whether the human protection system is activated, and wherein the electronic control unit is further configured to:

output, when the vehicle sensor is diagnosed as being faulty, a request for recording, as the failure history data, failure information in the failure history memory of the vehicle sensor diagnosed as being faulty, receive, from the vehicle sensor, the failure information recorded in the failure history memory of the vehicle sensor, and wherein the electronic control unit determines whether the vehicle sensor currently connected to the control apparatus has been previously diagnosed by the electronic control unit as being faulty based on the failure information received from the vehicle sensor.

14. The control system according to claim 12, wherein the electronic control unit is configured to diagnose whether the vehicle sensor is faulty, and wherein the electronic control unit is further configured to:

receive, from the vehicle sensor, a diagnosis result indicating whether the vehicle sensor is faulty, diagnose whether the vehicle sensor is faulty based on the diagnosis result received from the vehicle sensor, output, when the vehicle sensor is diagnosed as being faulty, a request for recording, as the failure history data, failure information in the failure history memory of the vehicle sensor diagnosed as being faulty, receive, from the vehicle sensor, the failure information recorded in the failure history memory of the vehicle sensor, and determine whether the vehicle sensor currently connected to the control apparatus has been previously diagnosed by the electronic control unit as being faulty based on the failure information received from the vehicle sensor.

15. The control system according to claim 12, wherein the electronic control unit is configured to diagnose whether the vehicle sensor is faulty and record failure information as the failure history data when the vehicle sensor is diagnosed as being faulty, and wherein the electronic control unit is further configured to:

receive the failure history data from the vehicle sensor, and determine whether the vehicle sensor currently connected to the control apparatus has been previously diagnosed as being faulty based on the failure history data received from the vehicle sensor.

* * * * *